United States Patent
Otani et al.

(10) Patent No.: US 6,813,238 B1
(45) Date of Patent: Nov. 2, 2004

(54) CABLE MODEM AND CABLE MODEM SYSTEM

(75) Inventors: Keiichi Otani, Kawasaki (JP); Takaya Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/421,464

(22) Filed: Oct. 19, 1999

(30) Foreign Application Priority Data

Dec. 17, 1998 (JP) .......................................... 10-359437

(51) Int. Cl.[7] .............................................. H04L 12/26
(52) U.S. Cl. ........................ 370/216; 370/401; 725/111
(58) Field of Search ........................ 370/216, 242–245, 370/255, 256, 401, 402; 725/111

(56) References Cited

U.S. PATENT DOCUMENTS

| | | | |
|---|---|---|---|
| 5,761,435 A | * | 6/1998 | Fukuda et al. ............... 709/238 |
| 6,304,575 B1 | * | 10/2001 | Carroll et al. ............... 370/408 |
| 6,628,624 B1 | * | 9/2003 | Mahajan et al. ............. 370/256 |
| 6,724,734 B1 | * | 4/2004 | Shabtay et al. ............. 370/254 |
| 2003/0193959 A1 | * | 10/2003 | Lui et al. ..................... 370/401 |
| 2003/0210706 A1 | * | 11/2003 | Chang et al. ................ 370/466 |

* cited by examiner

*Primary Examiner*—Melvin Marcelo
(74) *Attorney, Agent, or Firm*—Katten Muchin Zavis Rosenman

(57) ABSTRACT

A system for communication via cable-television communication lines includes a center device which generates a loop-detection packet for detecting a loop that is a defect of a network configuration, and a cable modem which is situated between said center device and a subscriber end, and detects the loop by regarding a receipt of the loop-detection packet from the subscriber end as a detection of the loop.

4 Claims, 22 Drawing Sheets

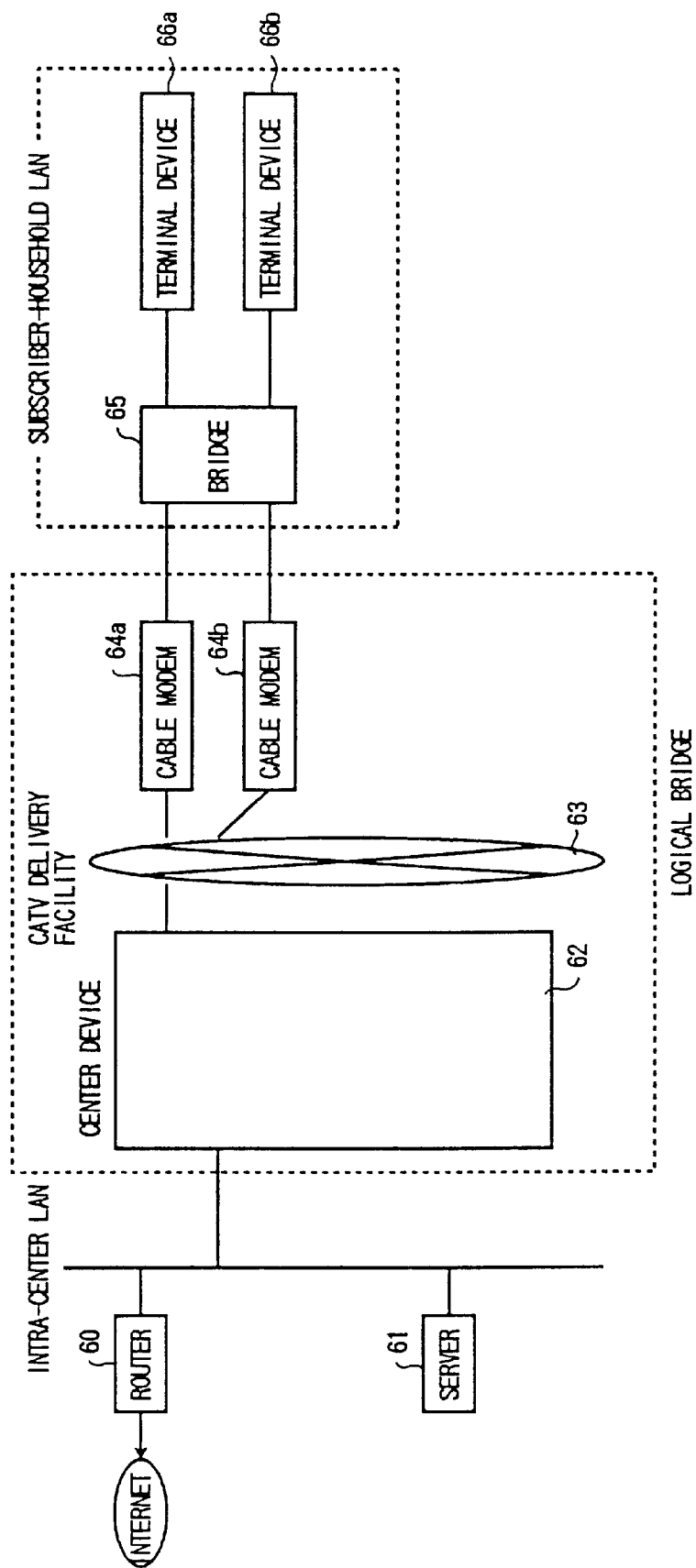
F I G. 6

F I G. 7
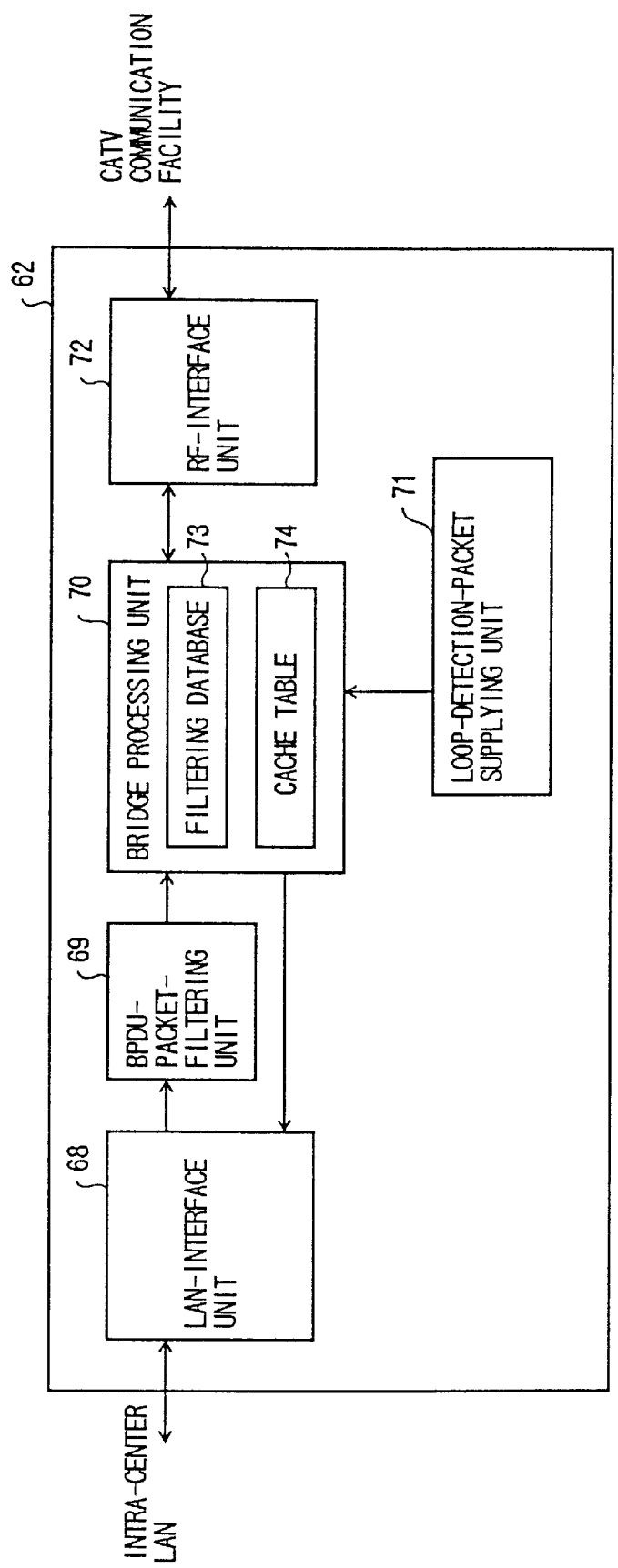

FIG. 9

| MAC ADDRESS | RECEIPT PORT | TRANSMISSION PORT | AGING TIMER |
|---|---|---|---|
| 00-00-00-00-00-10 | 0 | 1 | 200 |
| 00-00-00-00-00-01 | 1 | 0 | 150 |
| 00-00-00-00-00-21 | 1 | 0 | 100 |
| 00-00-00-00-00-22 | 1 | 0 | 120 |
| ⋮ | ⋮ | ⋮ | ⋮ |

F I G. 1 0

| MAC ADDRESS | CABLE-MODEM MUNBER (CID) | AGING TIMER |
|---|---|---|
| 00-00-00-00-00-01 | 1 | 1 0 0 0 |
| 00-00-00-00-00-21 | 2 | 5 0 0 |
| 00-00-00-00-00-22 | 2 | 7 0 0 |
| ⋮ | ⋮ | ⋮ |

FIG. 11

| MAC ADDRESS | AGING TIMER |
|---|---|
| 00-00-00-00-00-21 | 1 0 0 0 |
| 00-00-00-00-00-22 | 5 0 0 |
|  | 7 0 0 |
| ⋮ | ⋮ |

F I G. 12
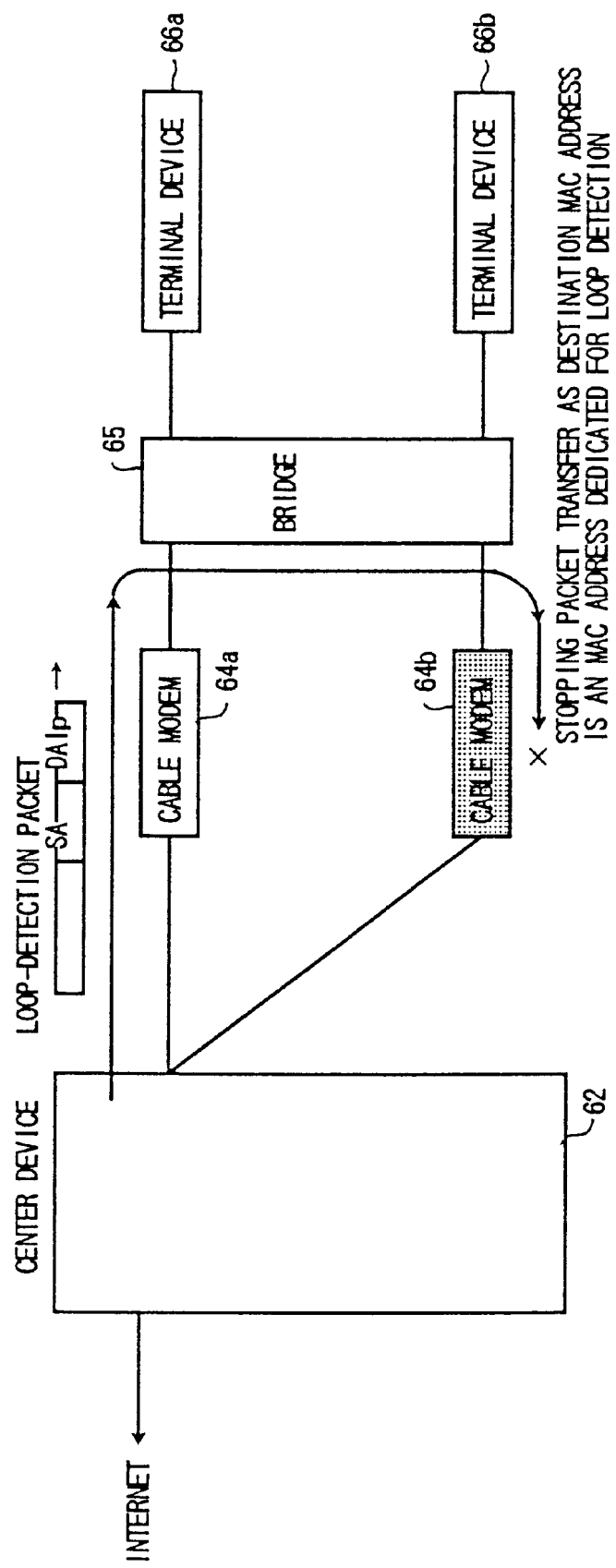

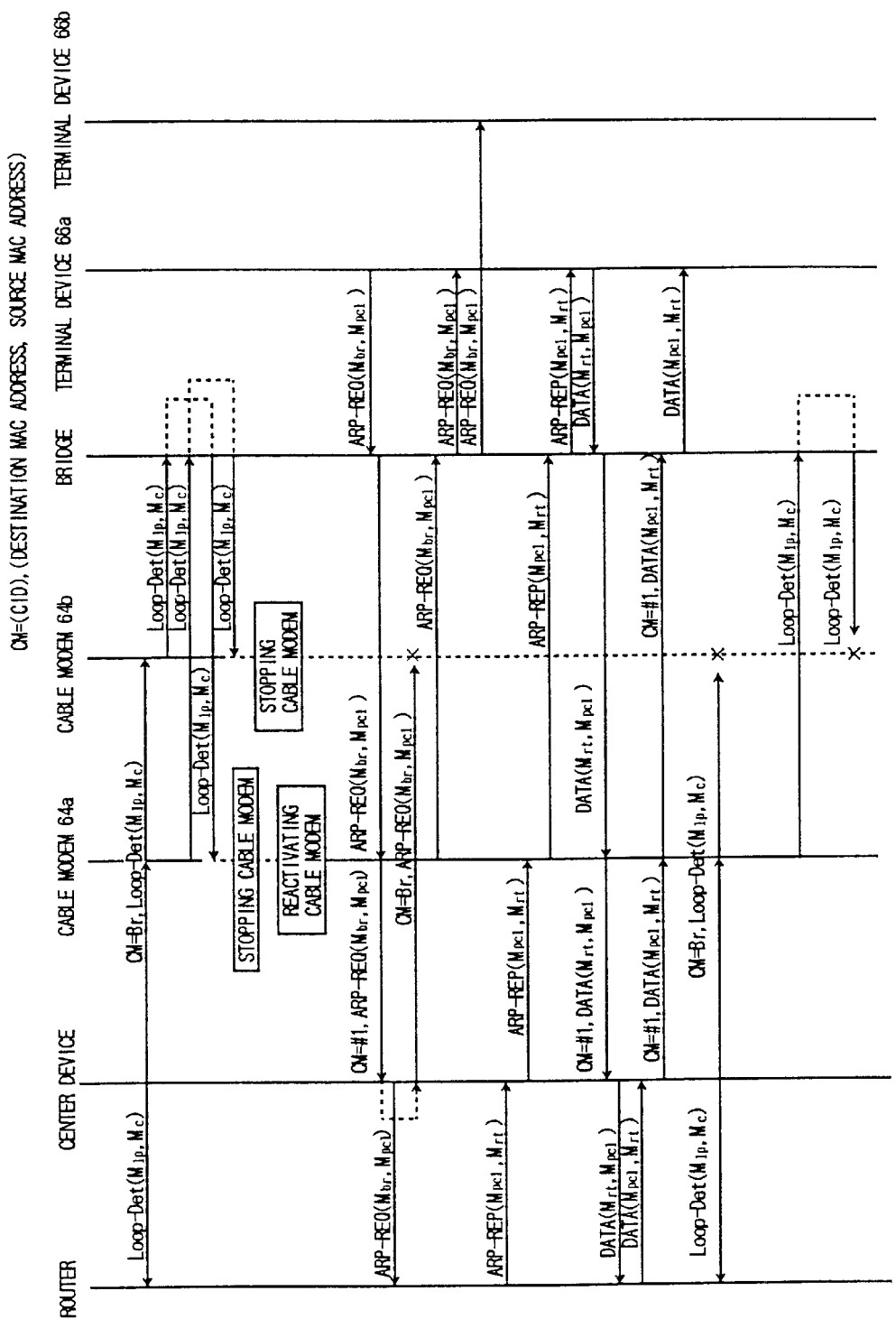
F I G. 14

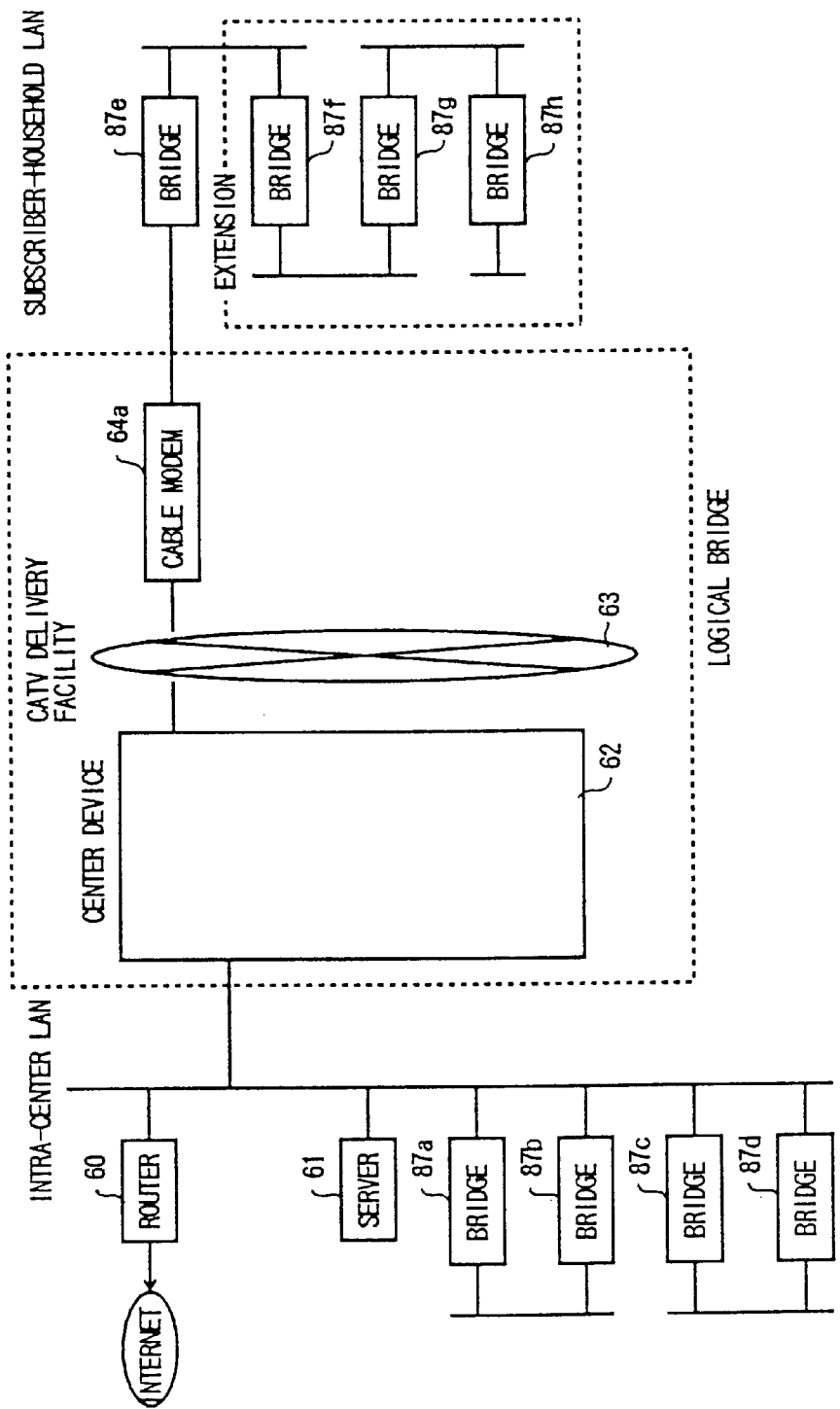

CABLE MODEM AND CABLE MODEM SYSTEM

BACKGROUND OF THE INVENTION

1. Field of the Invention

The present invention relates to cable modems and cable-modem systems, and particularly relates to a cable modem and a cable modem system which provide a connection to a LAN via a cable television transmission line.

2. Description of the Related Art

A cable television system (hereinafter referred to as a CATV system) distributes broadcast signals from a headend, which is a center of a CATV provider, to subscribers via trunk lines and branch lines, which are configured in a tree structure or in a star structure. The trunk lines and branch lines are used for transmission of broadband broadcast signals, and, thus, are implemented by using a coaxial cable or an optical fiber cable. This renders a CATV system a superior broadband transmission capacity.

In recent years, the Internet has made a significant market progress. Against this background, a superior broadband transmission capacity of a CATV system has been attracting attention, and efforts are underway to utilize CATV transmission lines as an access network to the Internet. A cable-modem system, in particular, is increasingly used in practice, connecting subscriber households to the Internet via a LAN interface utilizing CATV lines.

FIG. 1 is an illustrative drawing showing a configuration of a cable modem system. A description of the cable modem system will be given with reference to FIG. 1.

The cable modem system of FIG. 1 includes a CATV center 10, a CATV delivery facility 20, and a subscriber household 30. The CATV center 10 includes a center device 11, a headend device 12, photoelectric converters 13, a router 14, a server 15, personal computers 16, and bridges 17. The center device 11 is connected to an intra-CATV-center LAN at one end and to the headend device 12 at the other end. The headend device 12 transmits video signals and the like after demodulation and mixing of signals. The router 14 provides a connection to the Internet. The server 15 stores data therein to provide various services. The bridges 17 are used for connecting different LANs. The bridges 17 monitor packets, and reduces the number of packets in the LANs via a filtering function to dispose of unnecessary packets, thereby insuring transmission efficiency.

The CATV delivery facility 20 includes optical cables 21, photoelectric converters 22, coaxial cables 23, amplifiers 24, and tap-offs 25. Here, the tap-offs 25 are nodes or branching devices that connect between the CATV delivery facility 20 and the subscriber household 30.

The subscriber household 30 includes cable modems 31a through 31c, terminal devices 32a through 32d such as personal computers, and a bridge 17. The terminal device 32a, operating standalone, is connected to the CATV delivery facility 20 via the cable modem 31a. Further, a subscriber-household LAN 33 including the terminal devices 32b through 32d and the bridge 17 is connected to the CATV delivery facility 20 via the cable modems 31b and 31c.

When a user accesses the Internet via the terminal device 32c, the terminal device 32c supplies packets to the cable modem 31b or 31c, where the packets are converted into RF signals to be supplied to the CATV delivery facility 20 via the tap-offs 25. The RF signals attenuate as they propagate through the CATV delivery facility 20, so that the amplifiers 24 are provided to boost signal levels. The RF signals are converted into optical signals by the photoelectric converters 22, and the optical signals are then sent via the optical cables 21.

The photoelectric converters 13 convert the optical signals received from the optical cables 21 into electrical signals, and supplies reconstructed RF signals to the center device 11 via the headend device 12. The center device 11 selects a frequency band that is used as an uplink band for the cable modems 31a through 31c, and converts the RF signals of this frequency band into packet signals. The reconstructed packets are sent to the Internet via the router 14. When packets are supplied from the Internet, on the other hand, transfer of the packets is carried out by following steps of the same procedure as described above in a reversed order. In this manner, the user can access the Internet by using the cable modems 31a through 31c.

Unfortunately, there is a case in which a mistake in wire connections ends up causing the subscriber-household LAN 33 to create a closed loop, trapping packets inside. Such a loop may leads to a shutdown of the entire cable-modem system. In consideration of this, the bridge 17 is typically provided with a function to detect and sever a loop.

The bridge 17 in a conventional LAN system exchanges BPDU messages (packets) with other bridges by attaching its own MAC (media access control) address to these packets for the purpose of automatically detecting a loop. When a loop is detected, a bridge constituting part of the loop closes a relevant port thereof in order to sever the loop. This scheme is called a spanning tree scheme.

A cable-modem system is subject to standardization, and is required to serve as a bridge in compliance with standards set forth in the United States. A typical cable-modem system, therefore, adapts the spanning tree scheme in order to provide a function to detect and sever a loop in the same fashion as does a bridge of a conventional LAN system.

FIG. 2 is an illustrative drawing showing a logical configuration of a cable-modem system such as that shown in FIG. 1. With reference to FIG. 2, a description will be given with regard to a function to detect and sever a loop in a cable-modem system.

In FIG. 2, a center device 40 and cable modems 43a through 43e are each configured to serve as a bridge, and, for this purpose, are each provided with a filtering database 44. The filtering database 44 stores a definition as to whether to transit or dispose of a packet with respect to each MAC address. Such a definition is temporarily stored for a predetermined time period.

In the cable-modem system of FIG. 2, the center device 40 serves as a bridge BRIDGE0, and the cable modems 43a through 43n serve as bridges BRIDGE1 through BRIDGEn, respectively. The center device 40 has a port PORT0 thereof connected to the Internet via a router 41 and a port PORT1 thereof connected to a port PORT0 of each of the cable modems 43a through 43n. A port PORT1 of each of the cable modems 43a through 43n is connected to a terminal device 45 either directly or via a hub 46 and/or a bridge 47.

As described above, the center device 40 and the cable modems 43a through 43e are configured to serve as logically separate bridges, and are required to have a function to detect and sever a loop as such a loop may become a problem when implementing a LAN. Namely, each of the center device 40 and the cable modems 43a through 43e is so designed as to perform the spanning tree scheme.

Another configuration that can take care of the problem of a closed loop in a cable-modem system is to regulate communications between the cable modems 43a through 43e by requiring all the packets from the cable modems 43a through 43e to always make a transit at the center device 40. This can prevent formation of a closed loop.

FIG. 3 is an illustrative drawing showing another example of a logical configuration of a cable-modem system. The configuration of FIG. 3 has advantages in reduction of the load and conservation of resources.

The cable-modem system of FIG. 3 includes a center device 51 and cable modems 52a through 52n, all of which together constitute a logical bridge 50. The logical bridge 50 is equivalent to a bridge that has a port PORT0 on the side of the intra-CATV-center LAN and ports PORT1 through PORTn on the side of the subscriber-household LAN at the end of the cable modems 52a through 52n.

FIG. 4 is a block diagram showing a configuration of the center device of FIG. 3.

As shown in FIG. 4, the center device 51 serving as part of the logical bridge 50 includes a LAN-interface unit 55, a bridge processing unit 56, and an RF-interface unit 57.

FIG. 5 is a block diagram showing a configuration of one of the cable modems shown in FIG. 3.

As shown in FIG. 5, the cable modem serving as part of the logical bridge 50 includes an RF-interface unit 57 and a LAN-interface unit 55. In the logical bridge 50 of FIG. 3, the cable modems 52a through 52n serve simply as repeaters, each of which transfers signals by boosting signal levels.

The filtering database 44 is provided only in the center device 51, and controls transit processing of the logical bridge 50. The bridge processing unit 56 consults the filtering database 44, and determines whether to dispose of a received packet or to transfer a received packet to the LAN-interface unit 55 or the RF-interface unit 57. When it is decided that a received packet is to be supplied to the RF-interface unit 57, an ID number of one of the cable modems 52a through 52n and an MAC address of a terminal device attached thereto are paired and stored in a cache table 53. Here, the one of-the cable modems 52a through 52n registered in the cache table 53 is a destination of the received packet.

By registering an ID number of a destination cable modem and an MAC address of a terminal device attached thereto in the cache table 53, an ID number of a cable modem can be searched for based on an MAC address of a packet destination when communication is effected between the cable modems 52a through 52n or between the center device 51 and one of the cable modems 52a through 52n.

If the cache table 53 does not have an ID number and a MAC address stored therein, a packet is supplied to all the cable modems 52a through 52n. In this configuration shown in FIG. 3, therefore, no MAC address needs to be assigned to any one of the cable modems 52a through 52n.

Related-art cable-modem systems are designed and implemented as described above.

In cable-mode systems having each cable modem serving as a bridge as those developed and subject to standardization in the United States, a mechanism for implementing the spanning-tree scheme is necessary in addition to the mechanism for the bridge function. This requires highly complex data processing, and, also, requires each cable modem to have an MAC address attached thereto. Another problem is a cost increase.

Further, packets transmitted from the cable modems are always required to make a transit at the center device in some, systems in order to regulate communication between the cable modems. Such a system has a drawback in that services options are rather limited.

A cable system that has a center device and cable modems together constituting a single logical bridge is not equipped with a function to automatically detect and sever a loop. If a loop is created in a subscriber-household LAM, therefore, an entire system may run a risk of having to be shutdown.

When a loop develops in the cable modem system of FIG. 3, for example, an entire system is shutdown when a broadcast MAC packet or a multicast MAC packet is supplied to the loop. This is because the bridge 47 is designed to transfer a received broadcast or multicast MAC packet to a port on the opposite side. When broadcast or multicast MAC packets are continuously transferred in the loop, therefore, this results in a sudden increase in traffic.

In order to provide a function to automatically detect and sever a loop, each one of the cable modems 52a through 52n needs to have an MAC address assigned thereto. Since the cable modems 52a through 52n merely serve as repeaters, no MAC addresses are normally assigned. When considering a current situation where there is an explosive increase in use of the Internet, it is desirable to detect and sever a loop without assigning to an MAC address to each of the cable modems 52a through 52n.

Accordingly, there is a need for a cable modem and a cable-modem system which can detect and sever a loop without having MAC addresses assigned to cable modems.

SUMMARY OF THE INVENTION

Accordingly it is a general object of the present invention to provide a cable modem and a cable-modem system which can satisfy the need described above.

It is another and more specific object of the present invention to provide a cable modem and a cable-modem system which can detect and sever a loop without having MAC addresses assigned to cable modems.

In order to achieve the above needs according to the present invention, a system for communication via cable-television communication lines includes a center device which generates a loop-detection packet for detecting a loop that is a defect of a network configuration, and a cable modem which is situated between the center device and a subscriber end, and detects the loop by regarding a receipt of the loop-detection packet from the subscriber end as a detection of the loop.

The system described above can detect a loop created in a subscriber-household LAN. A principle underlying this loop detection is a premise that the loop-detection packet generated by the center device cannot be supplied to the cable modem from the subscriber end unless there is a loop at the subscriber end. Based on this principle, the present invention can detect and sever a loop.

According to another aspect of the present invention, a system for communication via cable-television communication lines includes a cable modem which is connected to a subscriber end, and counts broadcast or multicast packets supplied from the subscriber end to obtain a packet count, the cable modem detecting a loop that is a defect of a network configuration by regarding the packet count exceeding a predetermined number within a given constant interval as a detection of the loop.

The system described above can detect a loop created in a subscriber-household LAN. A principle underlying this loop detection is a premise that the number of broadcast or multicast packets supplied from the subscriber end within a given constant interval is not likely to exceed the predetermined number unless there is a loop at the subscriber end. Based on this principle, the present invention can detect and sever a loop.

According to another aspect of the present invention, a system for communication via cable-television communication lines includes a cable modem which is connected to a subscriber end, and stores source addresses of packets supplied from the subscriber end, the cable modem disposing of a packet supplied from the subscriber end if a destination address of the packet is one of the stored source addresses.

In the system as described above, the cable modem disposes of packets so as not to allow the packets to reach the center device when these packets are used for communication in a subscriber-household LAN, thereby insuring the privy of the communication.

According to another aspect of the present invention, a system for communication via cable-television communication lines includes a center device which stores an address of a source terminal device and an identifier of a source cable modem when receiving a packet from the source terminal device via the source cable modem, the address and the identifier being paired, and a cable modem, connected between the center device and a subscriber end, which stores in a memory an address of a source terminal device of a packet supplied from the subscriber end, and monitors addresses of packets supplied from the center device so as to dispose of a packet supplied from the center device and having a destination address not stored in the memory.

In the system described above, the cable modem disposes of the packet that is not supposed to be delivered to the terminal device connected to the cable modem. This insures that packets used for communication between a given terminal device and the Internet are not forwarded to another terminal device, thereby providing the privy of communication.

According to another aspect of the present invention, a system for communication via cable-television communication lines includes a center device, and a cable modem connected between the center device and a subscriber end, wherein both the center device and the cable modem dispose of a packet generated and supplied from a bridge if the packet has an address identifying the bridge.

The system as described above can prevent packets used for loop detection in the spanning-tree scheme from being exchanged between an intra-center LAN and a subscriber-household LAN.

In the spanning-tree scheme, the number of bridges between two ends needs to be fewer than seven in order to insure normal operations of the bridges. With such a requirement, a system having a change in the number of bridges in the subscriber-household LAN may encounter abnormal behavior of the bridges.

The system described above makes sure that the packets used for the spanning-tree scheme are not exchanged between the intra-center LAN and the subscriber-household LAN, so that the spanning-tree scheme should properly work within the confines of each LAN without being affected by other LAN systems.

Other objects and further features of the present invention will be apparent from the following detailed description when read in conjunction with the accompanying drawings.

BRIEF DESCRIPTION OF THE DRAWINGS

FIG. 6 is a block diagram of a cable-modem system according to a first embodiment of the present invention;

FIG. 7 is a block diagram of a center device of FIG. 6 according to the first embodiment of the present invention;

FIG. 9 is an illustrative drawing showing a structure of a filtering database;

FIG. 10 is an illustrative drawing showing a structure of a cache table;

FIG. 11 is an illustrative drawing showing a structure of another cache table;

FIG. 12 is an illustrative drawing for explaining a basic operation of a loop detection process;

FIG. 14 is a sequence diagram showing a loop-detection operation of the cable-modem system of FIG. 6 according to the first embodiment of the present invention;

FIG. 22 is a block diagram showing a cable-modem system according to a fourth embodiment of the present invention.

DESCRIPTION OF THE PREFERRED EMBODIMENTS

In the following, embodiments of the present invention will be described with reference to the accompanying drawings.

Figure 1:
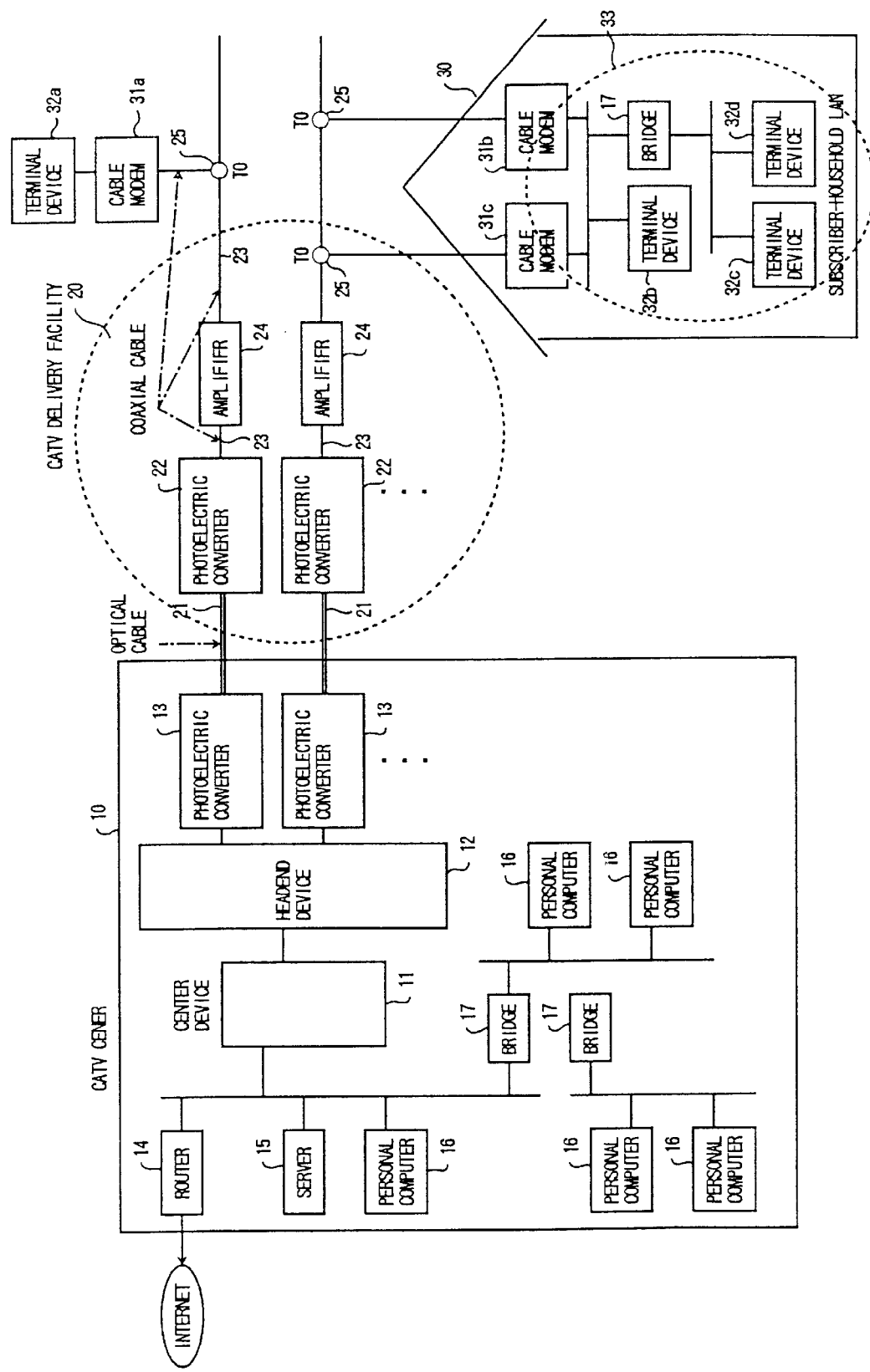
FIG. 1 is an illustrative drawing showing a configuration of a cable modem system.
Figure 2:
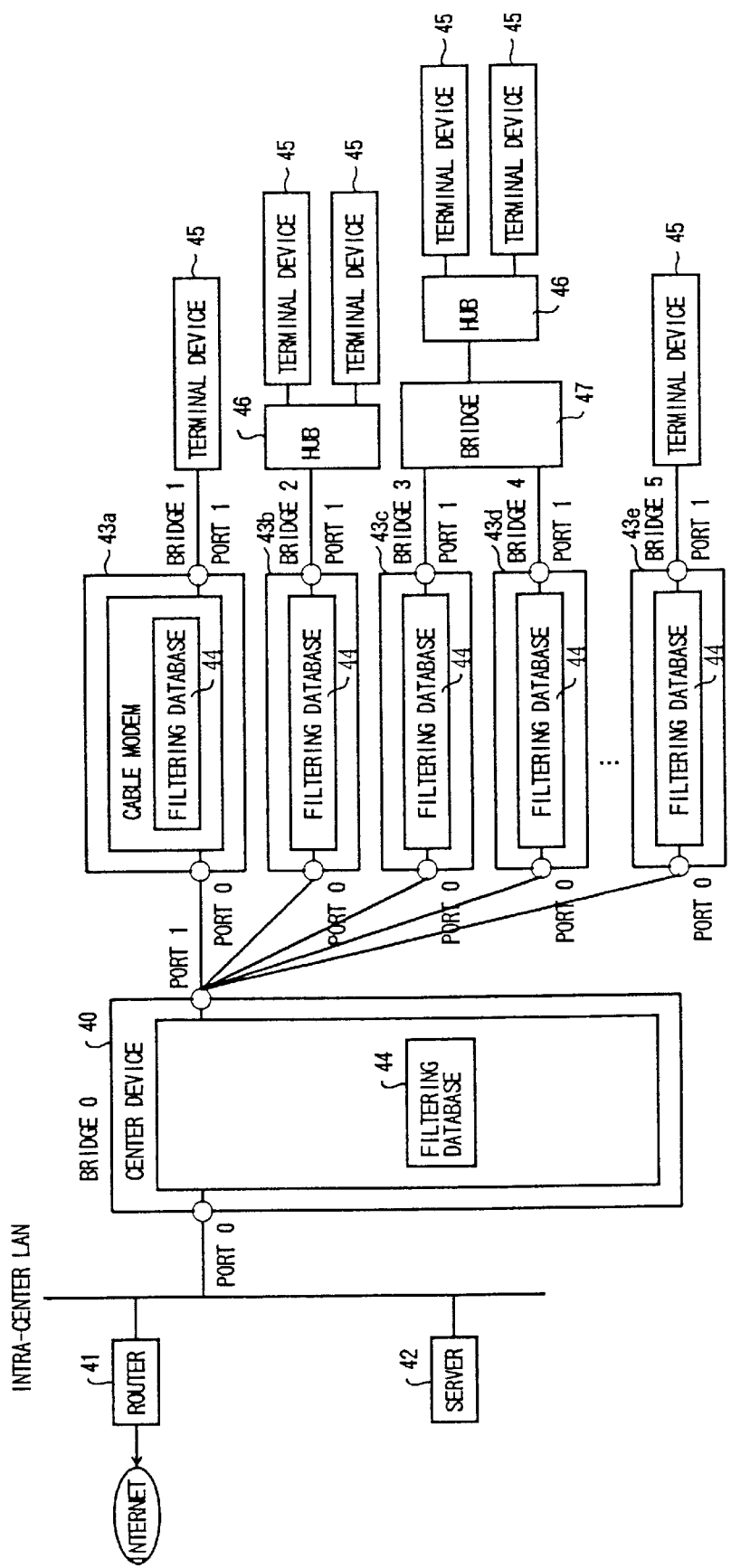
FIG. 2 is an illustrative drawing showing a logical configuration of a cable-modem system such as that shown in FIG. 1.
Figure 3:
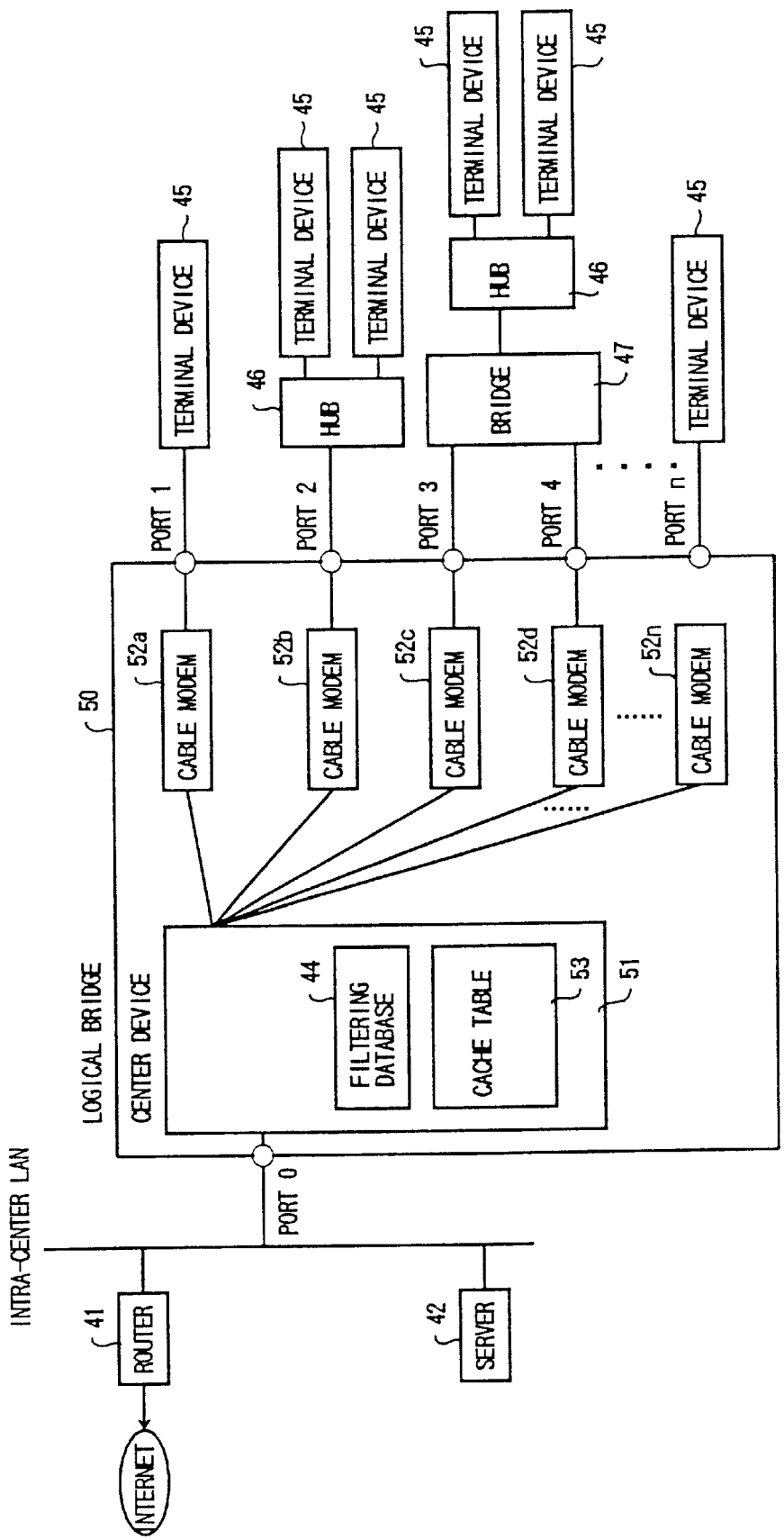
FIG. 3 is an illustrative drawing showing another example of a logical configuration of a cable-modem system.
Figure 4:
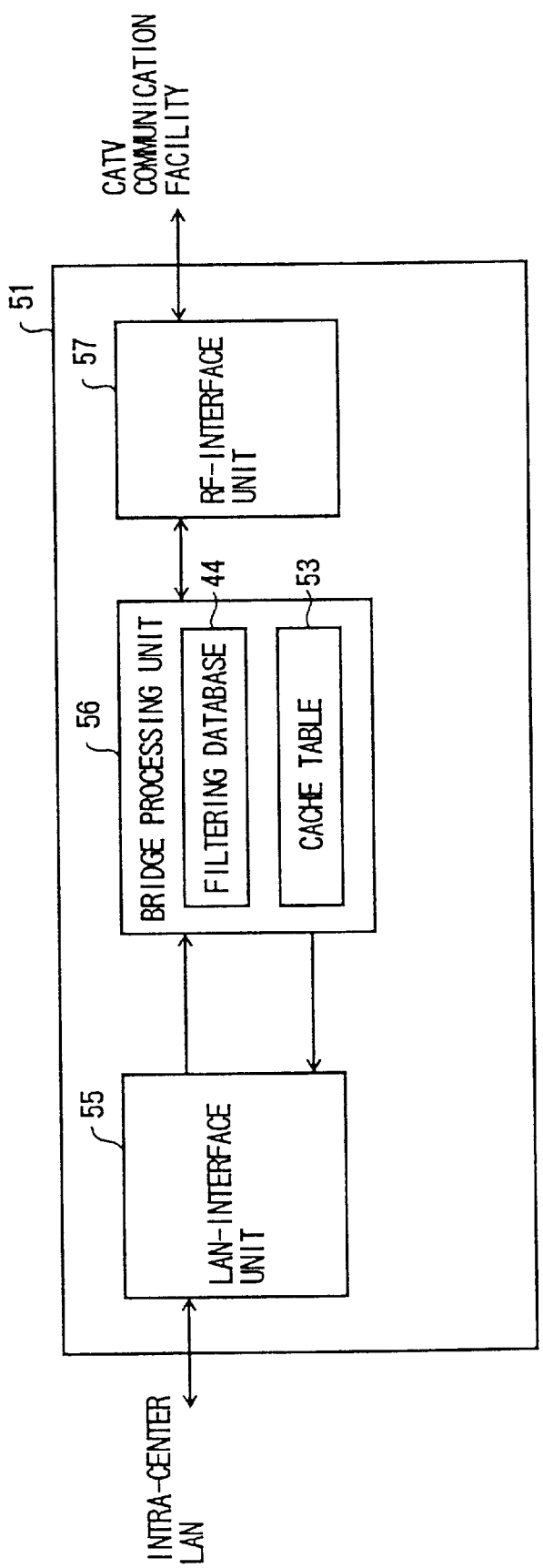
FIG. 4 is a block diagram showing a configuration of a center device of FIG. 3.
Figure 5:
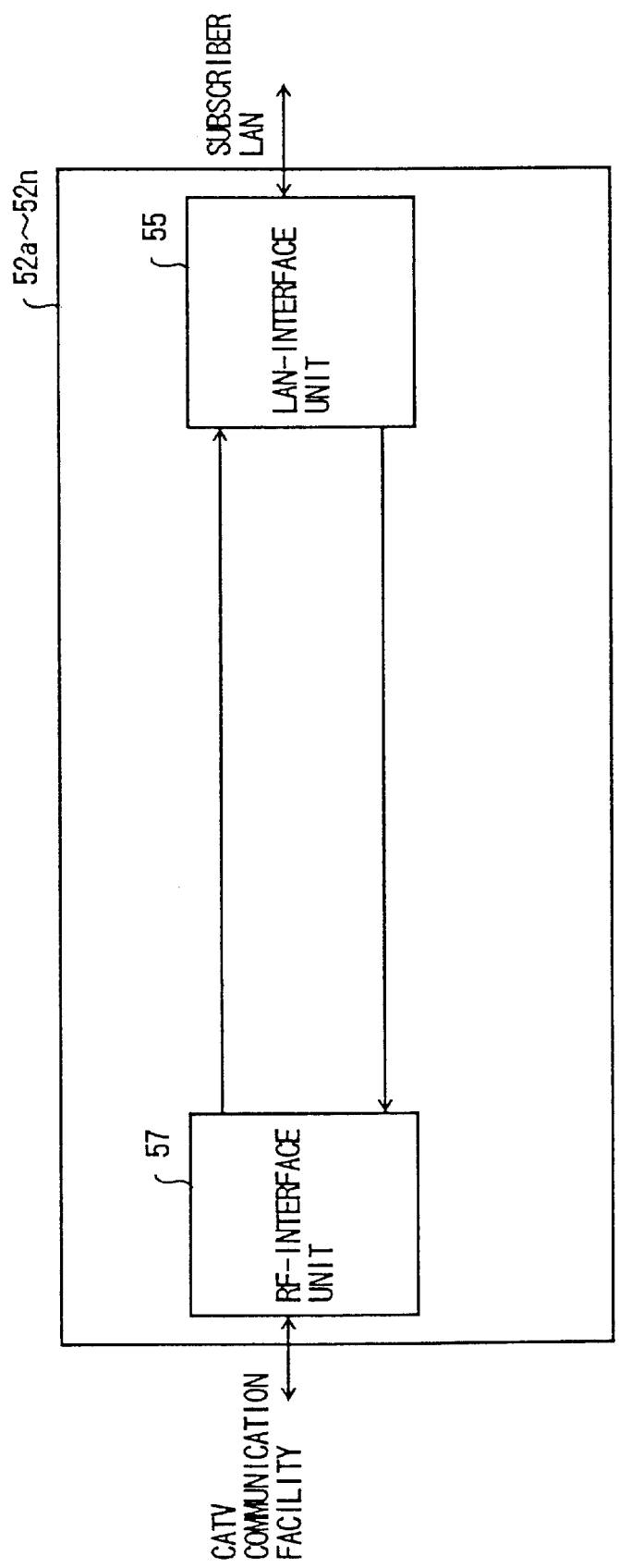
FIG. 5 is a block diagram showing a configuration of one of cable modems shown in FIG. 3.
Figure 8:
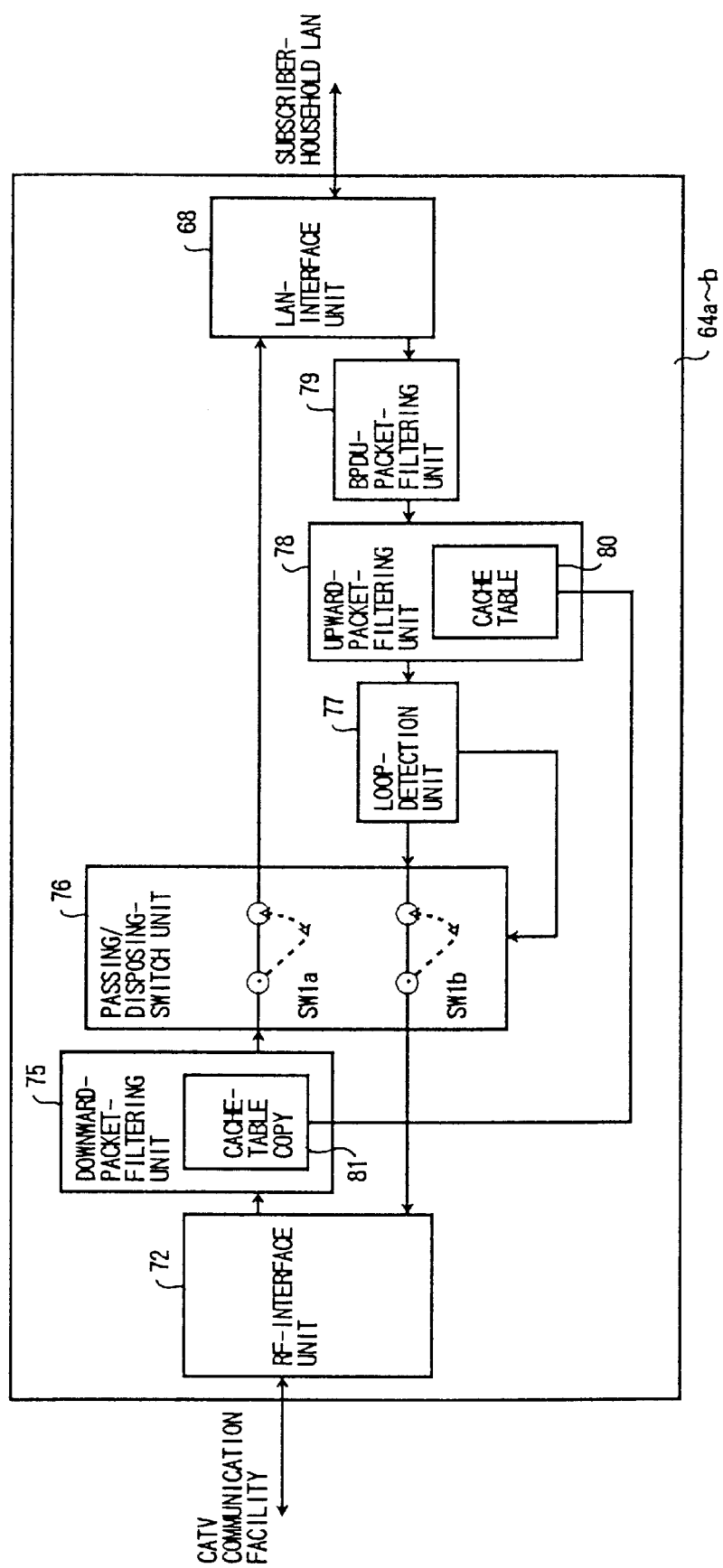
FIG. 8 is a block diagram of a cable modem of FIG. 6 according to the first embodiment of the present invention.

FIG. 6 is a block diagram of a cable-modem system according to a first embodiment of the present invention. FIG. 7 is a block diagram of a center device of FIG. 6 according to the first embodiment of the present invention. FIG. 8 is a block diagram of a cable modem of FIG. 6 according to the first embodiment of the present invention.

The cable-modem system of FIG. 6 includes a router 60, a server 61, a center device 62, a CATV delivery facility 63, cable modems 64a and 64b, a bridge 65, and terminal devices 66a and 66b. The router 60 serves to connect between LANs. The server 61 stores data therein to provide various services. The center device 62-connects between the CATV delivery facility 63 and intra-center LAN. The cable modems 64a and 64b are connected to the CATV delivery facility 63, and the bridge 65 is connected to the cable modems 64a and 64b. The terminal devices 66a and 66b such as personal computers are hooked up to the bridge 65. The center device 62 and the cable modems 64a and 64b together make up a logical bridge. Because of this configuration, the cable modems 64a and 64b do not have MAC addresses assigned thereto. Rather than MAC addresses, ID numbers for identification purposes are allocated to the cable modems 64a and 64b.

As shown in FIG. 7, the center device 62 includes a LAN-interface unit 68, BPDU-packet-filtering unit 69, a bridge processing unit 70, a loop-detection-packet supplying unit 71, and a RF-interface unit 72. The LAN-interface unit 68 is used for establishing contact with the intra-center LAN. The BPDU-packet-filtering unit 69 disposes of BPUD packets that are used for implementing the spanning-tree scheme. The bridge processing unit 70 determines whether to dispose of a received packet, and further determines, if the packet is not to be disposed of, whether to send the packet to the LAN-interface unit 68 or to the RF-interface unit 72. The bridge processing unit 70 includes a filtering database 73 and a cache table 74. The loop-detection-packet supplying unit 71 supplies loop-detection packets to the bridge processing unit 70. The RF-interface unit 72 establishes connection with the CATV delivery facility 63.

As shown in FIG. 8, the cable modems 64a and 64b include a RF-interface unit 72, a downward-packet-filtering unit 75, a passing/disposing-switch unit 76, a loop-detection unit 77, an upward-packet-filtering unit 78, a BPDU-packet-filtering unit 79, and a LAN-interface unit 68. The RF-interface unit 72 is used for establish connection with the CATV delivery facility 63. The downward-packet-filtering unit 75 disposes of packets received from the CATV delivery facility 63 after consulting a cache-table copy 81. The passing/disposing-switch unit 76 allows a passage of or disposes of a received packet by operating under the control of the loop-detection unit 77. The upward-packet-filtering unit 78 disposes of packets received from a subscriber-household LAN after consulting a cache table 80. The BPDU-packet-filtering unit 79 disposes of BPDU packets used in the spanning-tree scheme. The LAN-interface unit 68 establishes connection with the subscriber-household LAN. The contents of the cache table 80 are copied to the cache-table copy 81 such that consistency between the original and the copy is maintained at all times.

In the following, a description will be given with regard to operations of the filtering database 73, the cache table 74, and the cache table 80.

FIG. 9 is an illustrative drawing showing a structure of the filtering database. FIG. 10 is an illustrative drawing showing a structure of the cache table 74. FIG. 11 is an illustrative drawing showing a structure of the cache table 80.

As shown in FIG. 9, the filtering database 73 included in the bridge processing unit 70 stores therein MAC addresses of received-packet destinations. As entries each paired with an entry of an MAC address, the filtering database 73 further stores a receipt port, a transmission port, and an aging timer, which indicates a time period that passes before the corresponding MAC address is removed.

As shown in FIG. 10, the cache table 74 stores therein an MAC address identifying a destination of a received packet, an ID number of a cable modem connected to the destination terminal, and a aging timer, which indicates a time period that passes before the corresponding MAC address is removed. Hereinafter, the ID number of a cable modem will be referred to as a CID number.

As shown in FIG. 11, the cache table 80 included in the upward-packet-filtering unit 78 stores therein MAC addresses of the terminal devices 66a and 66b connected to the subscriber-household LAN. Further, the cache table 80 stores aging timers each paired with a corresponding MAC address, so that a time period that passes before deletion of an MAC address is specified.

In what follows, a description will be given with regard to how a loop is detected in the cable-modem system as described above.

Figure 13:
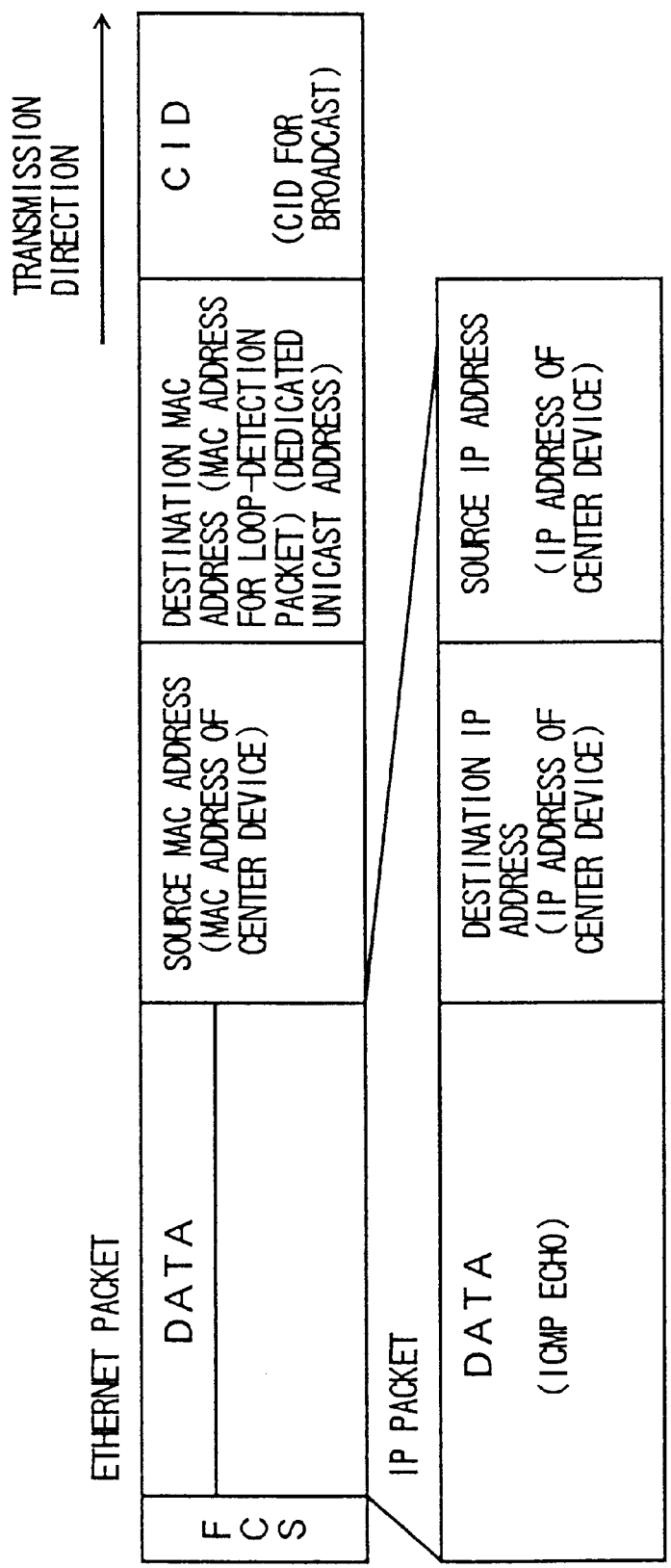
FIG. 13 is an illustrative drawing showing an example of a loop-detection-packet format.

FIG. 12 is an illustrative drawing for explaining a basic operation of a loop detection process. FIG. 13 is an illustrative drawing showing an example of a loop-detection-packet format.

In an example of FIG. 12, a loop is created along the center device 62, the cable modem 64a, the bridge 65, and the cable modem 64b.

The loop-detection-packet supplying unit 71 of the center device 62 supplies loop-detection packets to the bridge processing unit 70 at constant intervals. The loop-detection packets have a format as shown in FIG. 13. In each loop-detection packet, a dedicated unicast MAC address, which is not assigned to any terminals, is used as a destination MAC address.

As the center device 62 supplies a loop-detection packet to the cable modem 64a, the cable modem 64a transfers the loop-detection packet to the bridge 65. The bridge 65 checks a destination MAC address of the loop-detection packet, and finds that the destination is the dedicated unicast MAC address that is not assigned to any terminals. Failing to identify a terminal device corresponding to the destination MAC address, the bridge 65 sends the loop-detection packet to each of the cable modem 64b and the terminal devices 66a and 66b.

The cable modem 64b receives this loop-detection packet at the LAN-interface unit 68 as the loop-detection packet is supplied from the end of the subscriber-household LAN. The received loop-detection packet is supplied to the loop-detection unit 77 via the BPDU-packet-filtering unit 79 and the upward-packet-filtering unit 78. The loop-detection unit 77 continuously monitors destination MAC addresses of packets as the packets are supplied from the end of the subscriber-household LAN. When detecting the unicast MAC address that is specifically used for the loop-detection purpose, the loop-detection unit 77 ascertains that there is a loop, and instructs the passing/disposing-switch unit 76 to stop transferring of incoming packets.

The present invention detects a loop by utilizing the fact that in the absence of a loop, a loop-detection packet transmitted from the center device 62 is not supplied to either the cable modem 64a or 64b from the end of the subscriber-household-LAN. Based on this fact, the cable modems 64a and 64b monitor destination MAC addresses of the packets supplied from the end of the subscriber-household LAN, and check if any one of the destination MAC addresses is the unicast MAC address. This makes it possible to detect a loop.

As described above, the loop-detection packets have the destination MAC address thereof being the dedicated unicast MAC address, which is not assigned to any terminals. This insures that terminal devices of the intra-center LAN and the subscriber-household LAN are not affected, and that the loop-detection packets are not transferred to other networks via the router 60.

In what follows, a loop-detection operation will be described step by step with regard to the cable-modem system of FIG. 6.

FIG. 14 is a sequence diagram showing a loop-detection operation of the cable-modem system of FIG. 6 according to the first embodiment of the present invention. In FIG. 14, "Loop-Det($M_{lp}$, $M_c$)" represents a loop-detection packet that has a source MAC address indicating the center device 62 and a destination MAC address being the unicast MAC address.

"ARP-REQ($M_{br}$, $M_{pc1}$)" represents a packet that has a source MAC address indicating the terminal device 66a and a destination MAC address being a broadcast MAC 3address. Further, "CM=#1", for example, represents a packet that is transmitted from the cable modem 64a to the center device 62 via the CATV delivery facility 63 or a packet that is transmitted from the center device 62 to the cable modem 64a via the CATV delivery facility 63.

The center device 62 of FIG. 6 periodically transmits loop-detection packets to the router 60, the cable modem 64a, and the cable modem 64b. The loop-detection packets that are sent to the intra-center LAN do not affect operations of the intra-center LAN because the MAC addresses of these packets do not coincide with any one of terminal devices in the intra-center LAN. Also, none of these loop-detection packets are transferred to other networks via the router 60.

The cable modems 64a and 64b, on the other hand, transfer the loop-detection packets to the bridge 65 as they receive the packets via the CATV delivery facility 63. The bridge 65 checks destination MAC addresses of the loop-detection packets, and finds that the destinations are the dedicated unicast MAC address that is not assigned to any terminals. Failing to identify a terminal device corresponding to the destination MAC address, the bridge 65 sends the loop-detection packets supplied from the cable modem 64a to each of the cable modem 64b and the terminal devices 66a and 66b, and, also, sends the loop-detection packets supplied from the cable modem 64b to each of the cable modem 64a and the terminal devices 66a and 66b.

The cable modems 64a and 64b receive these loop-detection packets from the end of the subscriber-household LAN, and the received packets are supplied to the loop-detection unit 77 via the BPDU-packet-filtering unit 79 and&the upward-packet-filtering unit 78. The loop-detection unit 77 continuously monitors destination MAC addresses of packets as these packets are supplied from the end of the subscriber-household LAN. When detecting the unicast MAC address that is specifically used for the loop-detection purpose, the loop-detection unit 77 ascertains that there is a loop, and instructs the passing/disposing-switch unit 76 to stop transferring of incoming packets. As a result, the cable modems 64a and 64b stop transferring received packets.

In this manner, the cable-modem system of FIG. 6 checks if there, is a loop at constant intervals by utilizing loop-detection packets, and stops packet transfer at the cable modems 64a and 64b if a loop is detected. This prevents a system shutdown.

The cable modem 64a, for example, may be reactivated thereafter, in order to resume transfer of packets. Even when a loop-detection packet is supplied from the center device 62, the cable modem 64a does not stop transferring of packets since the packet transferring at the cable modem 64b is being halted.

Since the dedicated unicast MAC address of a loop-detection packet is not assigned to any terminals, there is no influence on the operations of the terminal devices 66a and 66b in the subscriber-household LAN.

In the following, a description will be given with regard to a variation of a cable modem according to the first embodiment of the present invention.

Figure 15:
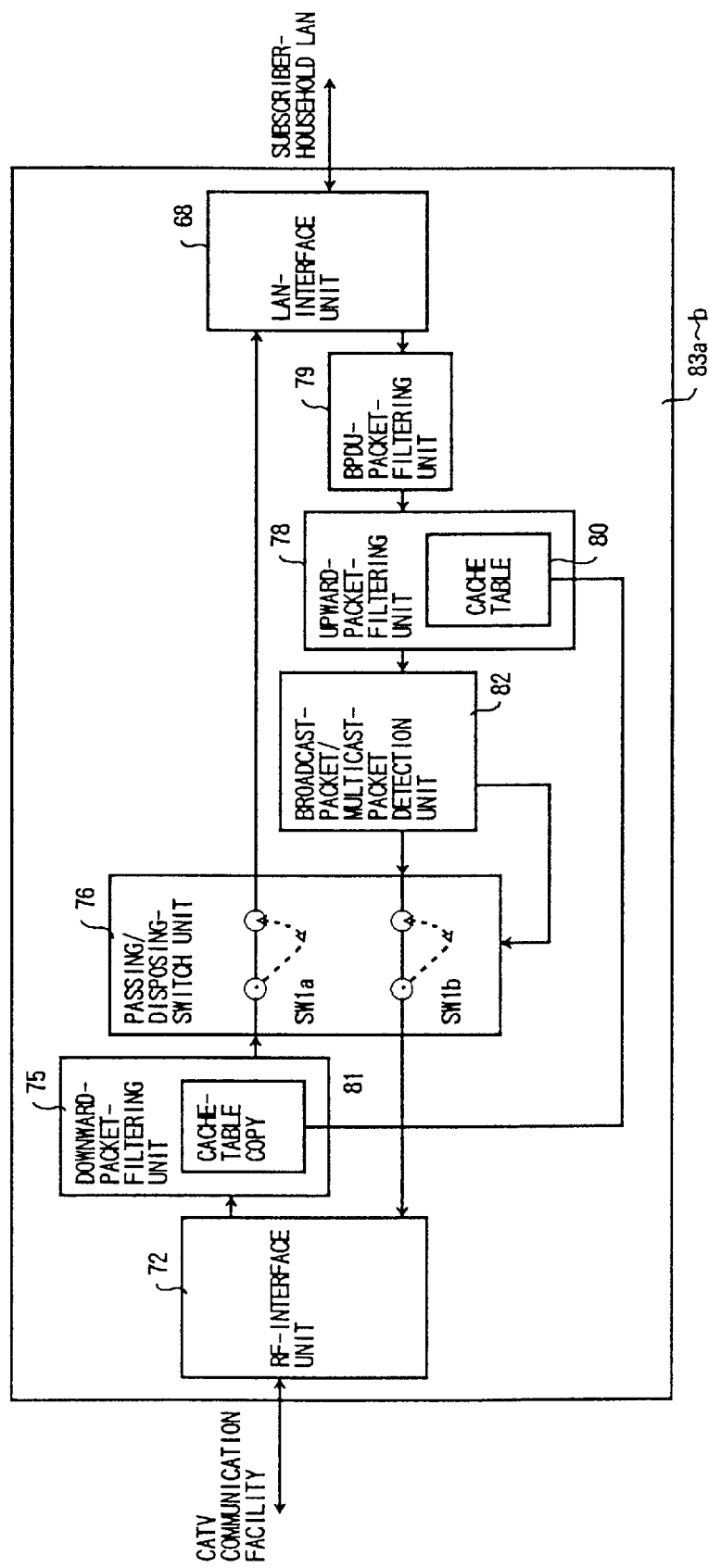
FIG. 15 is a block diagram of a variation of a cable modem according to the first embodiment of the present invention.

FIG. 15 is a block diagram of a variation of a cable modem according to the first embodiment of the present invention. The cable modem of FIG. 15 has the same structure as that of FIG. 8 except for some details. The same elements of FIG. 15 as those of FIG. 8 are referred to by the same numerals, and a description thereof will be omitted.

Cable modems 83a and 83b of FIG. 15 are implemented in the cable-modem system of FIG. 6 in the same manner as the cable modems 64a and 64b. The cable modems 83a and 83b of FIG. 15 include the RF-interface unit 72, the downward-packet-filtering unit 75, the passing/disposing-switch unit 76, the upward-packet-filtering unit 78, the BPDU-packet-filtering unit 79, the LAN-interface unit 68, and a broadcast-packet/multicast-packet detection unit 82, which detects a loop by counting the number of broadcast packets or multicast packets.

The contents of the cache table 80 are copied to the cache-table copy 81 such that consistency between the original and the copy is maintained at all times. The broadcast-packet/multicast-packet detection unit 82 is provided in place of the loop-detection unit 77 of FIG. 8, receiving packets from the upward-packet-filtering unit 78 and transferring the packets to the passing/disposing-switch unit 76.

In what follows, a description will be given with regard to how a loop is detected in the cable-modem system as described above.

Figure 16:
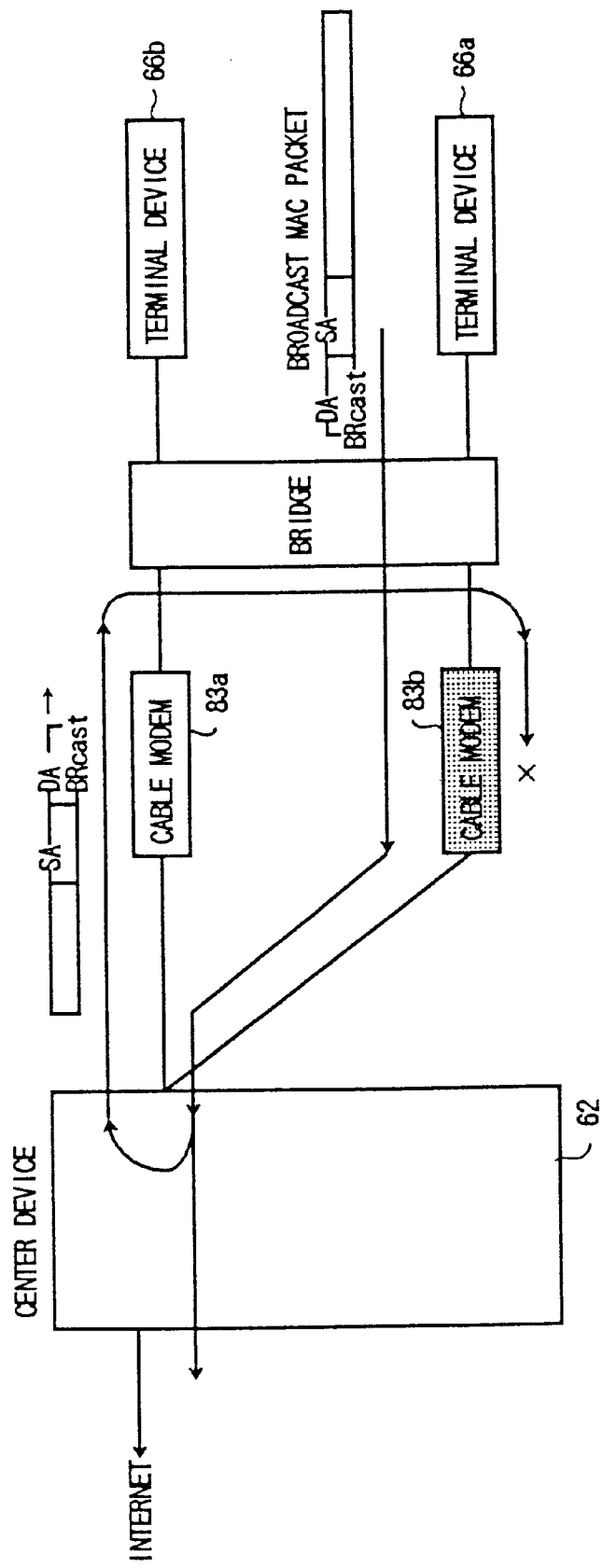
FIG. 16 is an illustrative drawing for explaining a basic operation of a loop detection process.

FIG. 16 is an illustrative drawing for explaining a basic operation of a loop detection process. In this example, a loop is created along the center device 62, the cable modem 83a, the bridge 65, and the cable modem 83b as shown in FIG. 16.

When a user attempts to access the Internet from the terminal device 66a, for example, the terminal device 66a transmits broadcast MAC packets to the cable modems 83a and 83b in response to the user operation. The broadcast MAC packets are transferred from the cable modem 83a to the center device 62 and also from the cable modem 83b to the center device 62. Here, the broadcast MAC packets have a destination MAC address thereof set to a broadcast MAC address.

Since the received packets have the broadcast MAC address, the center device 62 transfers the packets received from the cable modem 83a to the cable modems 83a and 83b, and transfers the packets received from the cable modem 83b to the cable modems 83a and 83b. In this manner, the broadcast MAC packets are repeatedly transferred between the center device 62 and the bridge 65 to increase in number.

The broadcast-packet/multicast-packet detection unit 82 included in each of the cable modems 83a and 83b monitors a destination MAC address of a packet received from the end of the subscriber-household LAN. While doing so, the broadcast-packet/multicast-packet detection unit 82 counts the number of broadcast MAC packets that have the broadcast MAC address as their destination MAC address.

When the number of the broadcast MAC packets supplied within a given constant timeframe exceeds a predetermined number, the broadcast-packet/multicast-packet detection unit 82 ascertains that there is a loop, and instructs the passing/disposing-switch unit 76 to stop transfer of packets.

The loop detection as described above draws on that fact that the number of broadcast MAC packets supplied from the end of the subscriber-household LAN within a given constant timeframe is not likely to exceed a predetermined number if there is no loop. Utilizing this fact, the cable modems 83a and 83b detect and sever a loop by counting the number of broadcast MAC packets supplied from the end of the subscriber-household, LAN within a given constant timeframe. Here, the same result is obtained even if multicast packets are used in place of the broadcast MAC packets.

In what follows, a loop-detection operation will be described with regard to the cable-modem system of FIG. 6 having the cable modems of FIG. 15.

Figure 17:
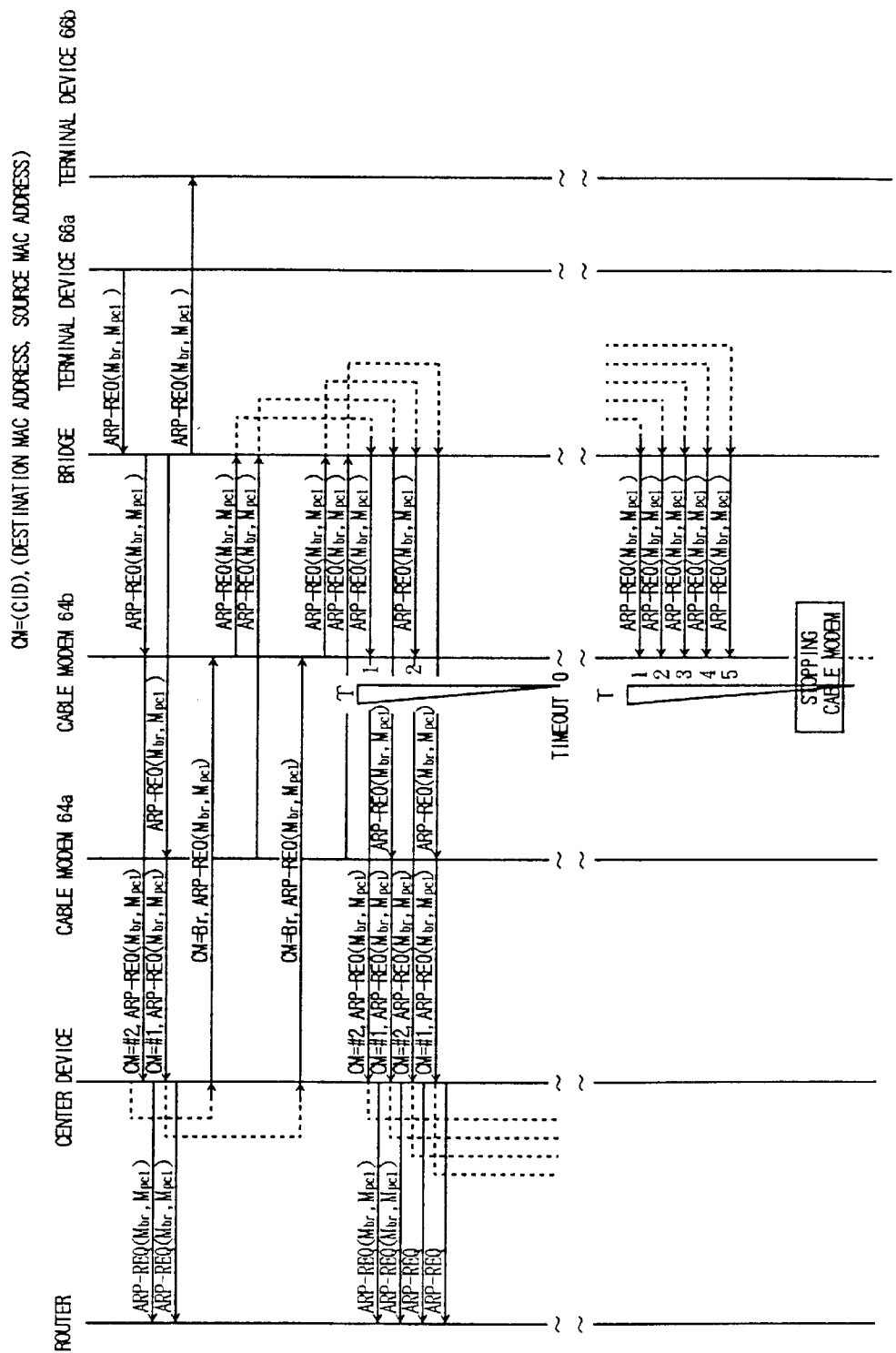
FIG. 17 is a sequence diagram showing a loop-detection operation of the cable-modem system using the cable modem of FIG. 15 according to the present invention.

FIG. 17 is a sequence diagram showing a loop-detection operation of the cable-modem system using the cable-modem of FIG. 15, according to the present invention. Legends used in FIG. 17 such as "Loop-Det($M_{lp}$, $M_c$)" are the same as those of FIG. 14, and a description thereof will be omitted.

When a user is to access the Internet from the terminal device 66a via the router 60, the terminal device 66a transmits an ARP-REQ packet as a broadcast MAC packet to the bridge 65. Since the supplied packet is that of a broadcast nature, the bridge 65 transfers the supplied broadcast MAC packet to each of the cable modem 83a, the cable modem 83b, and the terminal device 66b.

The cable modems 83a and 83b monitor destination MAC addresses of packets as it receives the packets from the end of the subscriber-household LAN. Since the number of broadcast MAC packets supplied from the end of the subscriber-household LAN within a given constant timeframe T does not exceed a predetermined number (e.g., 5), transferring of the packets continues at this time.

Each of the cable modems 83a and 83b transfers the broadcast MAC packet to the center device 62. Since the supplied packets are those of a broadcast nature, the center device 62 transfers the broadcast MAC packet supplied from the cable modem 83a to the cable modems 83a and 83b, and, also, transfers the broadcast MAC packet supplied from the cable modem 83b to the cable modems 83a and 83b.

Having received the two broadcast MAC packets from the center device 62, the cable modem 83a transfers these two packets to the bridge 65. By the same token, having received its two broadcast MAC packets from the center device 62, the cable modem 83b transfers these two packets to the bridge 65.

Since the supplied packets are those of a broadcast nature, the bridge 65 transfers the two broadcast MAC packets supplied form the cable modem 83a to each of the cable modem 83b and the terminal devices 66a and 66b, and, also, transfers the two broadcast MAC packets supplied form the cable modem 83b to each of the cable modem 83a and the terminal devices 66a and 66b.

At this time, each of the cable modems 83a and 83b receives two broadcast MAC packets. Since the number of the broadcast MAC packets received from the end of the subscriber-household LAN within a given constant timeframe does not exceed the predetermined number (e.g., 5), the transfer of packets still continues.

Each of the cable modems 83a and 83b transfers the two broadcast MAC packets to the center device 62. Having received the packets of a broadcast nature, the center device 62 transfers the two broadcast MAC packets supplied from the cable modem 83a to the cable modems 83a and 83b, and, also, transfers the two broadcast MAC packets supplied from the cable modem 83b to the cable modems 83a and 83b. Each of the cable modems 83a and 83b thus receives four broadcast MAC packets.

In this manner, broadcast MAC packets increase in number between the center device 62 and the bridge 65 because of the presence of a loop. As the number increases, there will be a point when the number of broadcast MAC packets supplied to the broadcast-packet/multicast-packet detection unit 82 from the end of the subscriber-household LAN during a given constant timeframe exceeds the predetermined number (e.g., 5). When this happens, the broadcast-packet/multicast-packet detection unit 82 ascertains that there is a loop, and instructs the passing/disposing-switch unit 76 to halt the transfer of packets.

In this manner, each of the cable modems 83a and 83b counts the number of the broadcast MAC packets arriving par predetermined interval from the end of the subscriber-household LAN, thereby detecting a loop and stopping transfer of packets. This results in prevention of system shutdown.

In the following, a cable-modem system according to a second embodiment of the present invention will be described.

Figure 18:
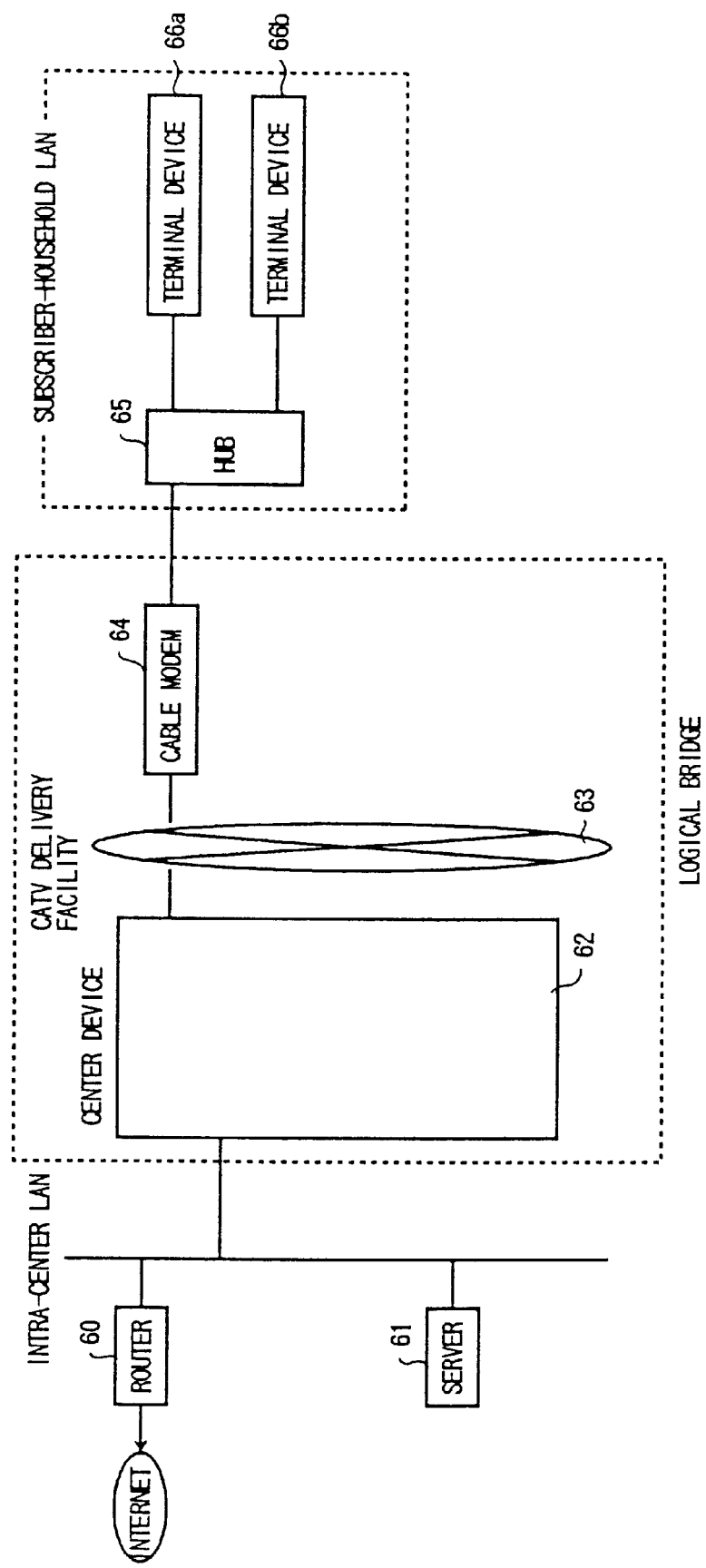
FIG. 18 is a block diagram showing a cable-modem system according to a second embodiment of the present invention.

FIG. 18 is a block diagram showing a cable-modem system according to a second embodiment of the present invention. The cable-modem system of FIG. 18 has a configuration closely similar to that of FIG. 6. In FIG. 18, the same elements as those of FIG. 6 are referred to by the same numerals, and a description thereof will be omitted.

The cable-modem system of FIG. 18 includes the router 60, the server 61, the center device 62, a cable modem 64, a hub 85 connected to the cable modem 64, and the terminal devices 66a and 66b connected to the hub 85. The cable modem 64 has either the configuration of FIG. 8 or the configuration of FIG. 15, and includes the upward-packet-filtering unit 78. Further, the hub 85 is a repeater hub.

In what follows, an operation of the cable-modem system of FIG. 18 will be described.

Figure 19:
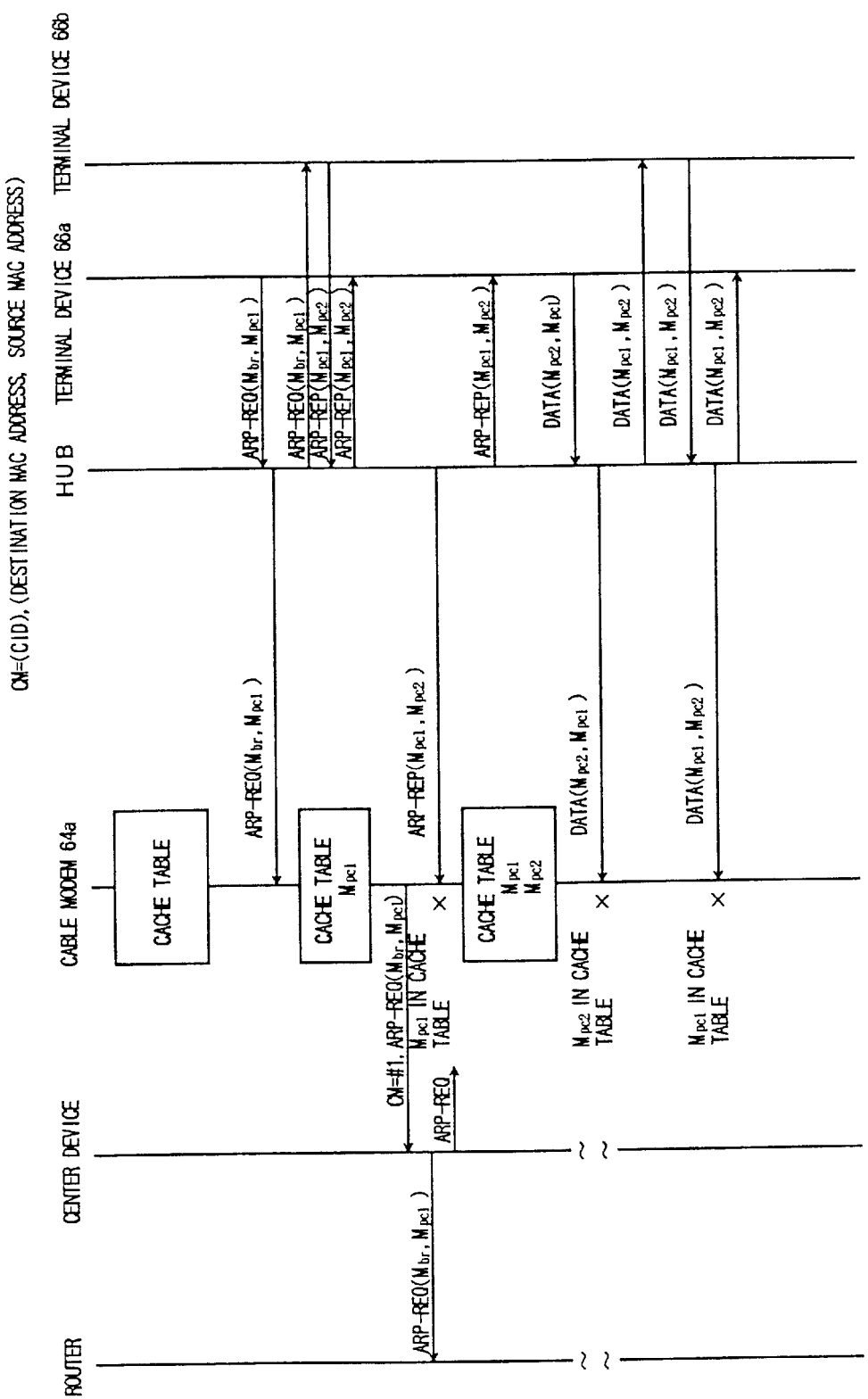
FIG. 19 is a sequence diagram showing an operation of the cable-modem system of FIG. 18 according to the present invention.

FIG. 19 is a sequence diagram showing an operation of the cable-modem system of FIG. 18 according to the present invention. Legends used in FIG. 19 such as "Loop-Det($M_{lp}$, $M_c$)" are the same as those of FIG. 14, and a description thereof will be omitted.

When a user attempts to establish communication in the subscriber-household LAN by connecting the terminal devices 66a and 66b together, the terminal device 66a transmits an ARP-REQ packet as a broadcast MAC packet to the hub 85 with an aim of detecting an MAC address of the terminal device 66b.

Being a repeater hub, the hub 85 forwards the ARP-REQ packet supplied from the terminal device 66a to each of the cable modem 64 and the terminal device 66b. Since the destination MAC address of the supplied ARP-REQ packet is a broadcast MAC address, the cable modem 64 forwards the ARP-REQ packet to the center device 62. Also, the cable modem 64 stores the source MAC address $M_{pc1}$ of the ARP-REQ packet in the cache table 80. Having received the ARP-REQ packet, the terminal device 66b transmits an ARP-REP packet to the hub 85 towards an ultimate destination of the terminal device 66a.

Being a repeater hub, the hub 85 forwards the ARP-REP packet supplied from the terminal device 66b to each of the cable modem 64 and the terminal device 66a. The upward-packet-filtering unit 78 of the cable modem 64 monitors destination MAC addresses of packets that are supplied from the end of the subscriber-household LAN, and checks if the destination MAC address $M_{pc1}$ of the ARP-REP packet is stored in the cache table 80.

Since the cache table 80 already has the MAC address $M_{pc1}$ stored therein, the cable modem 64 dispose of the supplied ARP-REP packet, and stores the source MAC address $M_{pc2}$ of this ARP-REP packet in the cache table 80. In the meantime, the terminal device 66a receives the ARP-REP packet, and learns the MAC address of the terminal device 66b.

When the terminal devices 66a and 66b communicate with each-other thereafter, data packets transmitted from these devices have the destination MAC address $M_{pc1}$ or $M_{pc2}$, which is stored in the cache table 80 of the upward-packet-filtering unit 78. These data packets are thus disposed of at the cable modem 64, and do not reach the center device 62.

In this manner, communication packets used in the subscriber-household LAN are not forwarded from the cable modem 64 to the center device 62, but are properly disposed of. This insures privy of the communication in the subscriber-household LAN.

In the following, a cable-modem system according to a third embodiment of the present invention will be described.

Figure 20:
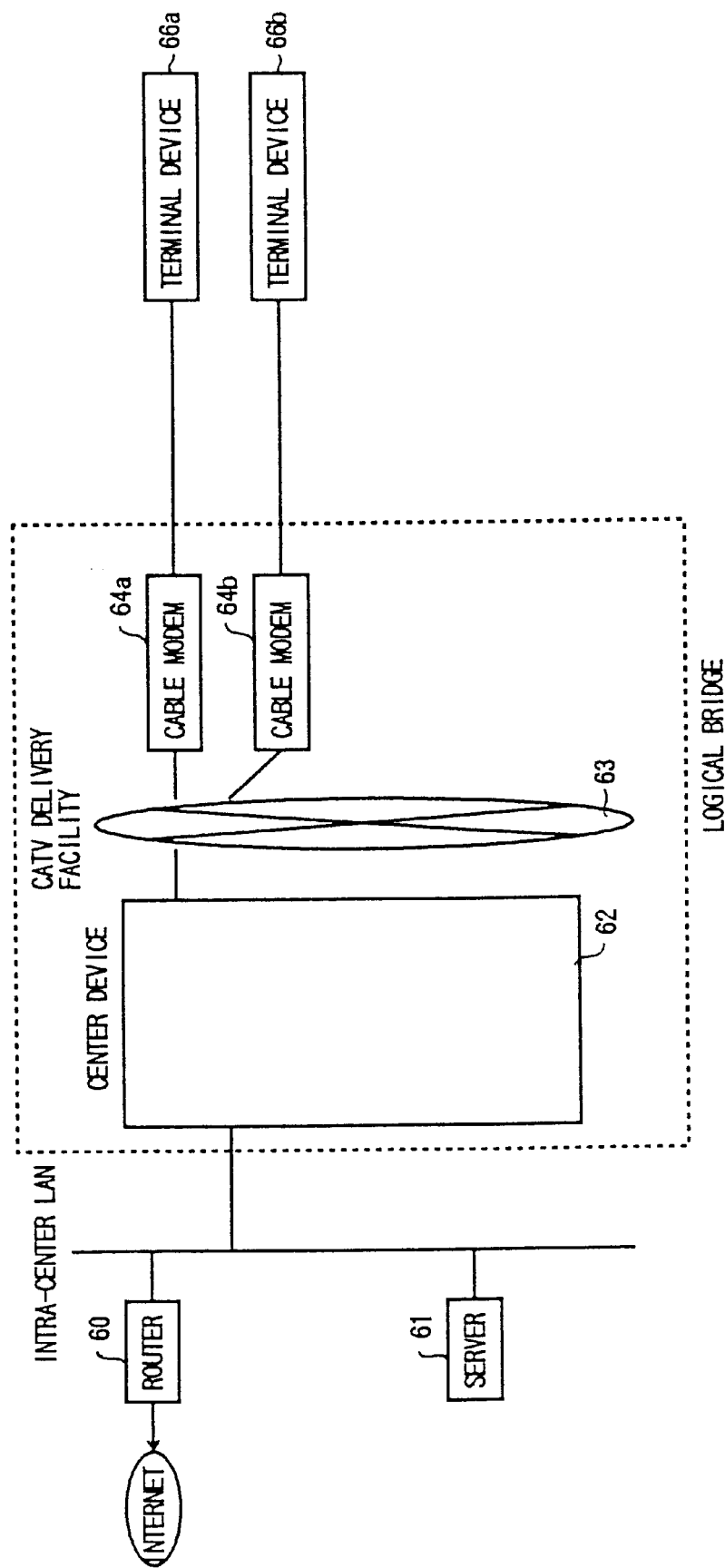
FIG. 20 is a block diagram showing a cable-modem system according to a third embodiment of the present invention.

FIG. 20 is a block diagram showing a cable-modem system according to the third embodiment of the present invention. The cable-modem system of FIG. 20 has a configuration closely similar to that of FIG. 6. In FIG. 20, the same elements as those of FIG. 6 are referred to by the same numerals, and a description thereof will be omitted.

The cable-modem system of FIG. 20 includes the router 60, the server 61, the center device 62, the cable modems 64a and 64b, and the terminal devices 66a and 66b, which are connected to the cable modems 64a and 64b, respectively. The cable modems 64a and 64b have either the configuration of FIG. 8 or the configuration of FIG. 15, and include the upward-packet-filtering unit 78 and the downward-packet-filtering unit 75.

In what follows, an operation of the cable-modem system of FIG. 20 will be described.

Figure 21:
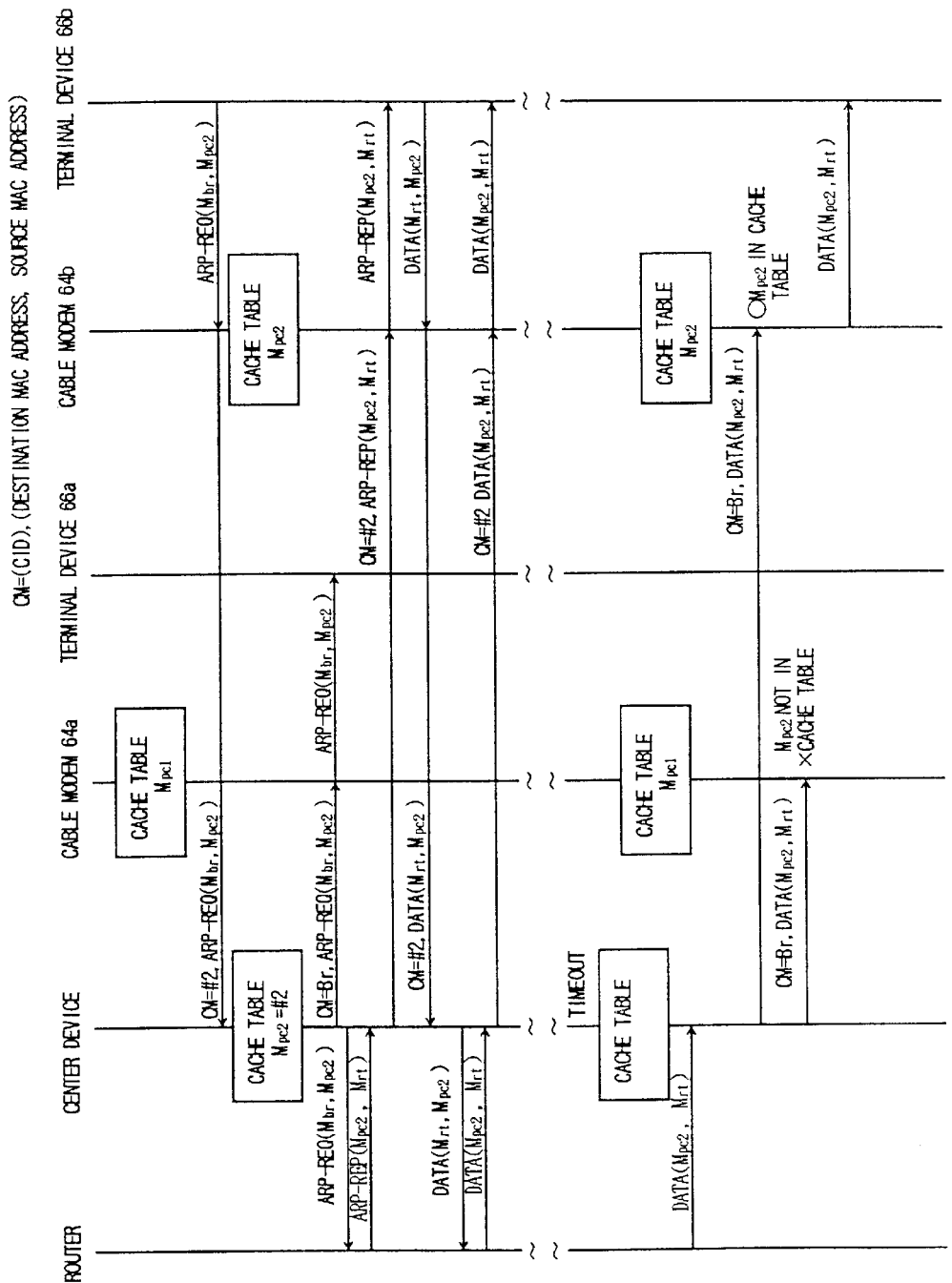
FIG. 21 is a sequence diagram showing an operation of the cable-modem system of FIG. 20 according to the third embodiment of the present invention.

FIG. 21 is a sequence diagram showing an operation of the cable-modem system of FIG. 20 according to the third embodiment of the present invention. Legends used in FIG. 21 such as "Loop-Det($M_{lp}$, $M_c$)" are the same as those of FIG. 14, and a description thereof will be omitted.

The cache table 80 of the cable modem 64a has an MAC address $M_{pc1}$ of the terminal device 66a already stored therein. When a user accesses the Internet from the terminal device 66b via the router 60, the terminal device 66b transmits an ARP-REQ packet as a broadcast MAC packet to the cable modem 64b.

The cable modem 64b forwards the received ARP-REQ packet to the center device 62 since the ARP-REQ packet has a broadcast MAC address as its destination MAC address. Further, the cable modem 64b stores a source MAC address $M_{pc2}$ of the packet in the cache table 80.

The center device 62 stores the source MAC address $M_{pc2}$ of the received ARP-REQ packet and a CID #2 of the source cable modem 64b in the cache table 74, and, also, transfers the ARP-REQ packet to the router 60. Further, the center device 62 attaches a broadcast CID number to the received ARP-REQ packet, and sends the ARP-REQ packet with this attachment to the CATV delivery facility 63.

Having received the ARP-REQ packet from the center device 62, the router 60 sends an ARP-REP packet to the center device 62 towards an ultimate destination of the terminal device 66b. The bridge processing unit 70 of the center device 62 monitors destination MAC addresses of packets supplied from the end of the intra-center LAN. Having received the ARP-REP packet from the router 60, the bridge processing unit 70 identifies a CID number corresponding to the destination MAC address $M_{pc2}$ of this ARP-REP packet in the cache table 74. Finding the CID #2 corresponding to the destination MAC address $M_{pc2}$, the center device 62 attaches the CID #2 as a header to the ARP-REP packet, and sends this packet to the cable modem 64b.

The cable modem 64b forwards the received ARP-REP packet to the terminal device 66b. As a result, the terminal device 66b learns the MAC address of the router 60 from the supplied ARP-REP packet.

Thereafter, the terminal device 66b sends DATA packets to the cable modem 64b by setting destination MAC addresses of these DATA packets to the MAC address of the router 60. The cable modem 64b forwards the DATA packets to the center device 62 via the CATV delivery facility 63 as these packets are supplied from the terminal device 66b. The center device 62 then forwards the DATA packets to the router 60. The router 60 transfers the DATA packets to the Internet, and receives reply DATA packets from the Internet. The reply DATA packets are sent to the center device 62.

The bridge processing unit 70 of the center device 62 identifies a CID number corresponding to the destination MAC address $_{pc2}$ of the DATA packets in the cache table 74, and attaches the identified CID #2 as a header to the DATA packets. The DATA packets with the attached header are sent to the cable modem 64b. The cable modem 64b then forwards the DATA packets to the terminal device 66b.

After this, when no communication is observed for a substantially long period of time between the center device 62 and the cable modems 64a and 64b, the MAC address $M_{pc2}$ and CID #2 are deleted from the cache table 74 as their allocated time period expires. When DATA packets directed to the terminal device 66b are supplied from the Internet, the router 60 transfers the DATA packets to the center device 62.

When the bridge processing unit 70 of the center device 62 searches in the cache table 74 for a CID number corresponding to the destination MAC address $M_{pc2}$ of these DATA packets, no CID number is obtained because the corresponding entry was already deleted. Then, the center device 62 attaches a broadcast CID Br to the DATA packets as a header, and sends them to the cable modems 64a and 64b.

When receiving the DATA packets, the cable modem 64b searches in the cache-table copy 81 of the downward-packet-filtering unit 75 to check if an MAC address corresponding to the destination MAC address of the DATA packets is stored therein.

Since such a corresponding MAC address is found in the cache-table copy 81, the cable modem 64b forwards the DATA packets to the terminal device 66b. In the meantime, the cable modem 64a cannot find an MAC address corresponding to the destination MAC address of the DATA packets in the cache-table copy 81, and, thus, does not forward the DATA packets to the terminal device 66a.

In this manner, the cable modems 64a and 64b store the MAC addresses of the respective terminal devices 66a and 66b in the cache-table copy 81 of the downward-packet-filtering unit 75. If the MAC address stored in the cache-table copy 81 differs from the destination MAC address of a received packet, the packet will be disposed of. This insures privy of the communication with the Internet.

In the following, a cable-modem system according to a fourth embodiment of the present invention will be described.

FIG. 22 is a block diagram showing a cable-modem system according to the fourth embodiment of the present invention. The cable-modem system of FIG. 22 has a configuration closely similar to that of FIG. 6. In FIG. 22, the same elements as those of FIG. 6 are referred to by the same numerals, and a description thereof will be omitted.

The cable-modem system of FIG. 22 includes the router 60, the server 61, the center device 62, bridges 87a through 87h, and the cable modem 64. The bridges 87a through 87d are connected to the intra-center LAN, and the remaining bridges 87e through 87h are connected to the subscriber-household LAN.

Among the bridges 87e through 87h which are connected to the subscriber-household LAN, the bridge 87e is part of an original configuration of this system, and the other bridges 87f through 87h are those later added as extensions. The center device 62 has the configuration of FIG. 7, for example, and includes the BPDU-packet-filtering unit 69. The cable modem 64 has either the configuration of FIG. 8 or the configuration of FIG. 15, and includes the BPDU-packet-filtering unit 79.

In a single network that is comprised of bridges for exchanging BPDU packets and supporting spanning-tree protocols, the number of bridges between two end bridges needs to be fewer than seven according to the recommendations of the IEEE 802.1D. This requirement insures that the spanning-tree function works correctly provided that each bridge is set to its default settings. Hereinafter, the number of bridges is referred to as a bridge diameter.

The cable-modem system of FIG. 22 has a bridge diameter of 5 before the bridges 87f through 87h are added as extensions to the subscriber-household LAN, so that the spanning-tree function works normally in this system. After the addition of the bridges 87f through 87h to the subscriber-household LAN, however, the bridge diameter of the cable-modem system becomes 8, which may result in the spanning-tree function not working correctly.

To obviate this problem the cable-modem system of FIG. 22 has the BPDU-packet-filtering unit 69 and the BPDU-packet-filtering unit 79 in the center device 62 and the cable modem 64, respectively, for the purpose of disposing of BPDU packets. The center device 62 uses the BPDU-packet-filtering unit 69 to dispose of BPDU packets supplied from the bridge 87a. The cable modem 64 uses the BPDU-packet-filtering unit 79 to dispose of BPDU packets supplied from the bridge 87e.

This insures that no exchange of BPDU packets is conducted between the intra-center LAN and the subscriber-household LAN. The intra-center LAN and the subscriber-household LAN thus cause no effect on other LANs connected to the cable-modem system as far as a bridge diameter thereof is concerned.

Further, the present invention is not limited to these embodiments, but various variations and modifications may be made without departing from the scope of the present invention.

The present application is based on Japanese priority application No. 10-359437 filed on Dec. 17, 1998, with the Japanese Patent Office, the entire contents of which are hereby incorporated by reference.

What is claimed is:

1. A system for communication via cable-television communication lines, comprising:

a center device; and a cable modem connected between said center device and a subscriber end, wherein both said center device and said cable modem dispose of a packet generated and supplied from a bridge if the packet has an address identifying the bridge.

2. The system as claimed in claim 1, wherein said cable modem stores source addresses of packets supplied from the subscriber end, said cable modem disposing of a packet supplied from the subscriber end if a destination address of the packet is one of the stored source addresses.

3. The system as claimed in claim 2, wherein said cable modem includes:

a memory which stores the source addresses of the packets supplied from the subscriber end;

a packet filtering unit which disposes of a packet that is supplied from the subscriber end and has a destination address thereof stored in said memory.

4. The system as claimed in claim 1, wherein said center device stores an address of a source terminal device and an identifier of a source cable modem when receiving a packet from the source terminal device via the source cable modem, the address and the identifier being paired; and said cable modem, connected between said center device and a subscriber end, stores in a memory an address of a source terminal device of a packet supplied from the subscriber end, and monitors addresses of packets supplied from said center device so as to dispose of a packet supplied from said center device having a destination address not stored in the memory.

* * * * *